(12) United States Patent
Coomer

(10) Patent No.: US 7,388,177 B2
(45) Date of Patent: Jun. 17, 2008

(54) MOBILE INDUCTION BRAZING AND QUENCHING MACHINE

(75) Inventor: Phillip Edward Coomer, Trenton, TN (US)

(73) Assignee: Masco Corporation of Indiana, Indianapolis, IN (US)

( * ) Notice: Subject to any disclaimer, the term of this patent is extended or adjusted under 35 U.S.C. 154(b) by 20 days.

(21) Appl. No.: 11/025,184

(22) Filed: Dec. 29, 2004

(65) Prior Publication Data

US 2006/0138125 A1 Jun. 29, 2006

(51) Int. Cl.
*H05B 6/10* (2006.01)
*C21D 1/18* (2006.01)

(52) U.S. Cl. ............... 219/615; 219/632; 219/651; 266/90; 266/129; 148/575

(58) Field of Classification Search ........ 219/615–617, 219/632, 651; 266/90, 96, 129; 148/574–575, 148/526, 567
See application file for complete search history.

(56) References Cited

U.S. PATENT DOCUMENTS

| 3,153,132 | A | | 10/1964 | Greene | |
|---|---|---|---|---|---|
| 3,842,234 | A | | 10/1974 | Seyfried | |
| 4,532,396 | A | * | 7/1985 | Burack et al. | 219/632 |
| 5,766,378 | A | * | 6/1998 | Horn | 148/526 |
| 6,084,224 | A | | 7/2000 | Wiezbowski | |
| 6,160,247 | A | * | 12/2000 | Storm et al. | 219/639 |
| 6,291,807 | B2 | | 9/2001 | Wiezbowski | |
| 6,649,887 | B2 | | 11/2003 | Budinger | |
| 6,781,084 | B2 | | 8/2004 | Brockman et al. | |
| 2002/0069945 | A1* | | 6/2002 | Streubel et al. | 148/574 |

FOREIGN PATENT DOCUMENTS

JP 2003-129129 * 5/2003

* cited by examiner

*Primary Examiner*—Philip Leung
(74) *Attorney, Agent, or Firm*—Baker & Daniels LLP

(57) ABSTRACT

An induction brazing and quenching apparatus and related method of coupling components together.

32 Claims, 23 Drawing Sheets

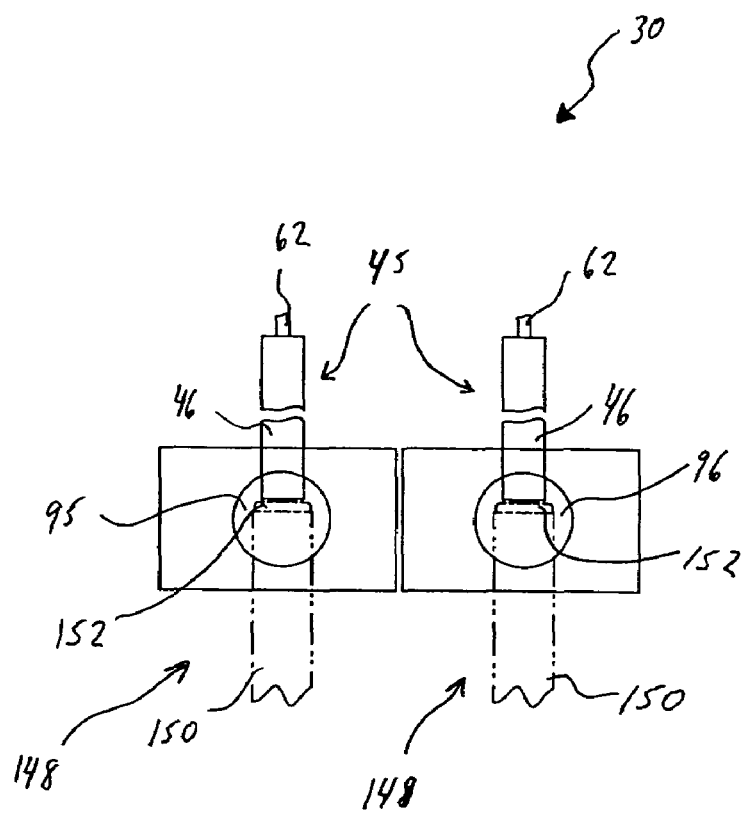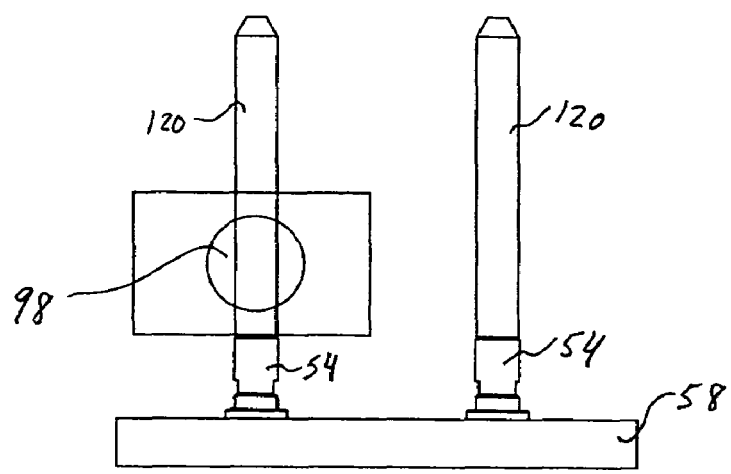
FIG. 16

MOBILE INDUCTION BRAZING AND QUENCHING MACHINE

FIELD OF THE INVENTION

The present invention relates to an apparatus and related method of coupling first and second components together by brazing.

BACKGROUND AND SUMMARY OF THE INVENTION

Brazing is a well-known method of coupling two metal parts together by fusing a layer of fusible material, such as solder, between adjoining surfaces. It is also known to heat the fusible material in the region of the coupling, thereby causing the fusible material to melt. Upon cooling, the fusible material consolidates to form a brazed coupling.

Apparatus currently available for brazing components together are generally large, immobile machines that require large amounts of water. There are generally two techniques of brazing, including gas brazing and induction brazing. Parts that are brazed with gas brazing machines are generally cleaned with an acid etching process to remove carbon deposits formed in the brazing process. Heat control may be difficult and often requires constant adjustment. Generally, gas brazing machines are preheated before running production. Induction brazing involves the use of induction coils to induce localized heat in the materials being brazed. Heating occurs primarily as a result of the resistance to flow of current induced in conductive materials when placed in a magnetic field produced by a rapidly alternating current. The alternating current in the parts to be brazed is generated by the induction coils, the geometry of which dictates the electromagnetic field.

In an illustrative embodiment of the present invention, a brazing apparatus includes a fixture configured to support first and second components. An induction coil is supported for movement relative to the fixture and is configured to braze the first component to the second component. A quenching applicator is supported for movement relative to the fixture and is configured to supply coolant to the first and second components. A gas supply is coupled to the quenching applicator.

According to a further illustrative embodiment of the present invention, a brazing apparatus includes a fixture configured to support a part assembly, and an induction coil configured to move relative to the fixture and to heat the part assembly. A quenching applicator is configured to move relative to the induction coil and the fixture. The quenching applicator is further configured to cool the part assembly after heating. A controller is configured to control movement of the induction coil and the quenching applicator.

In a further illustrative embodiment of the present invention, a quenching system for cooling a part includes a gas supply, a liquid supply, and a valve system coupled to the gas supply and the liquid supply. An applicator is coupled to valve system, and a controller is configured to control the valve system to quench a part with at least one of a gas from the gas supply and a liquid from the liquid supply. The controller is further configured to control the valve system to purge liquid from the nozzle after the part has been quenched.

According to yet another illustrative embodiment of the present invention, an apparatus includes an induction coil configured to heat first and second components, and a quenching system having an applicator. The applicator is configured to apply a gas and a liquid to the first and second components, either simultaneously or sequentially.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 16 is a partial front view of an alternative embodiment fixture and the induction coils of the mobile induction brazing apparatus of FIG. 1, illustrating in phantom a pair of part assemblies inserted into the fixture in a loading position and supported by the upper posts;

DETAILED DESCRIPTION OF THE DRAWINGS

Figure 1:
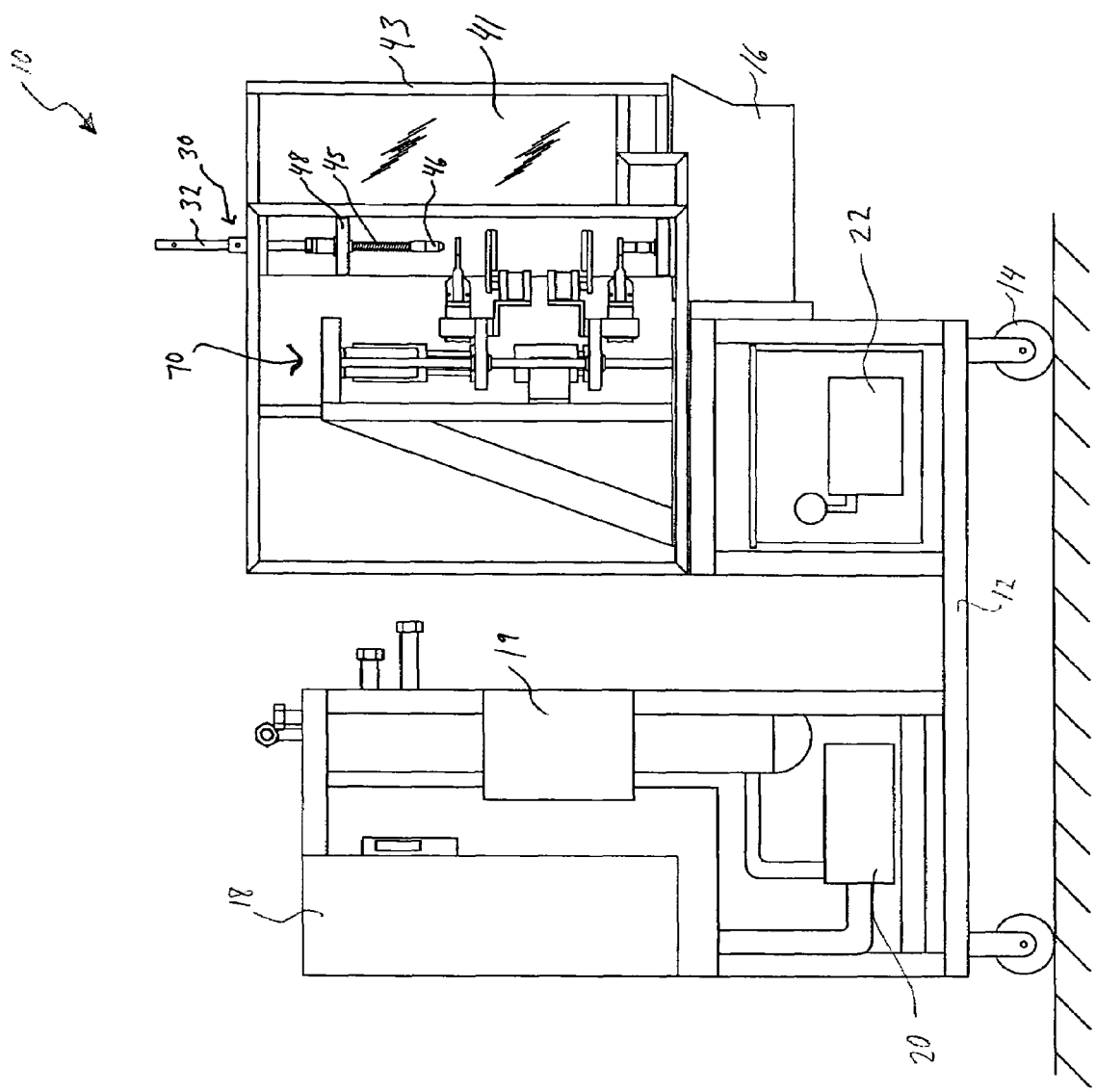
FIG. 1 is a side elevational view of a mobile induction brazing apparatus according to an illustrative embodiment of the present invention.

Referring initially to FIG. 1, a mobile induction brazing apparatus 10 is shown. Apparatus 10 includes a frame 12 supported by casters 14, a power supply 19, a chiller unit 18, a chiller pump 20, a fixture 30, and an operating assembly 25. The operating assembly 25 includes a brazing unit 70 and quenching applicators 26 and 28, which are coupled to a quench water basin 16 and a quench water reservoir 22. Apparatus 10 also includes a outer frame 43 that supports shield 41. Shield 41 may be made of a transparent thermoplastic, or any other suitable material. Power supply 19 is of conventional design and receives power from a power source such as a wall outlet (not shown) and distributes power to electrical components of the apparatus 10. Chiller unit 18 is also of conventional design and includes a closed-loop heat exchanger for sensing and controlling the temperature of a liquid coolant. Pump 20 circulates coolant through the chiller unit 18 to cool power supply 19 and prevent overheating thereof. Casters 14 support frame 12 and allow the apparatus 10 to be moved easily, for example within an industrial plant or similar facility. Quench water basin 16 collects liquid coolant, such as water, that is used to quench parts after the brazing process. Quench water reservoir 22 includes a recirculation pump 23 (FIG. 24) and stores coolant for quenching brazed parts. Quench water basin 16, quench water reservoir 22, including recirculation pump 23, and quenching applicators 26 and 28, all form part of a quenching system 73 (FIG. 24) configured to minimize water waste and facilitate mobility of the apparatus 10. Further, since the quenching system 73 is a closed, recirculating system, there is no need for a waste water drain, although one could be installed in alternative embodiments. It should be appreciated that the mobility of the apparatus 10 facilitates repositioning the apparatus 10 to accommodate a wide variety of work area layouts.

Figure 2:
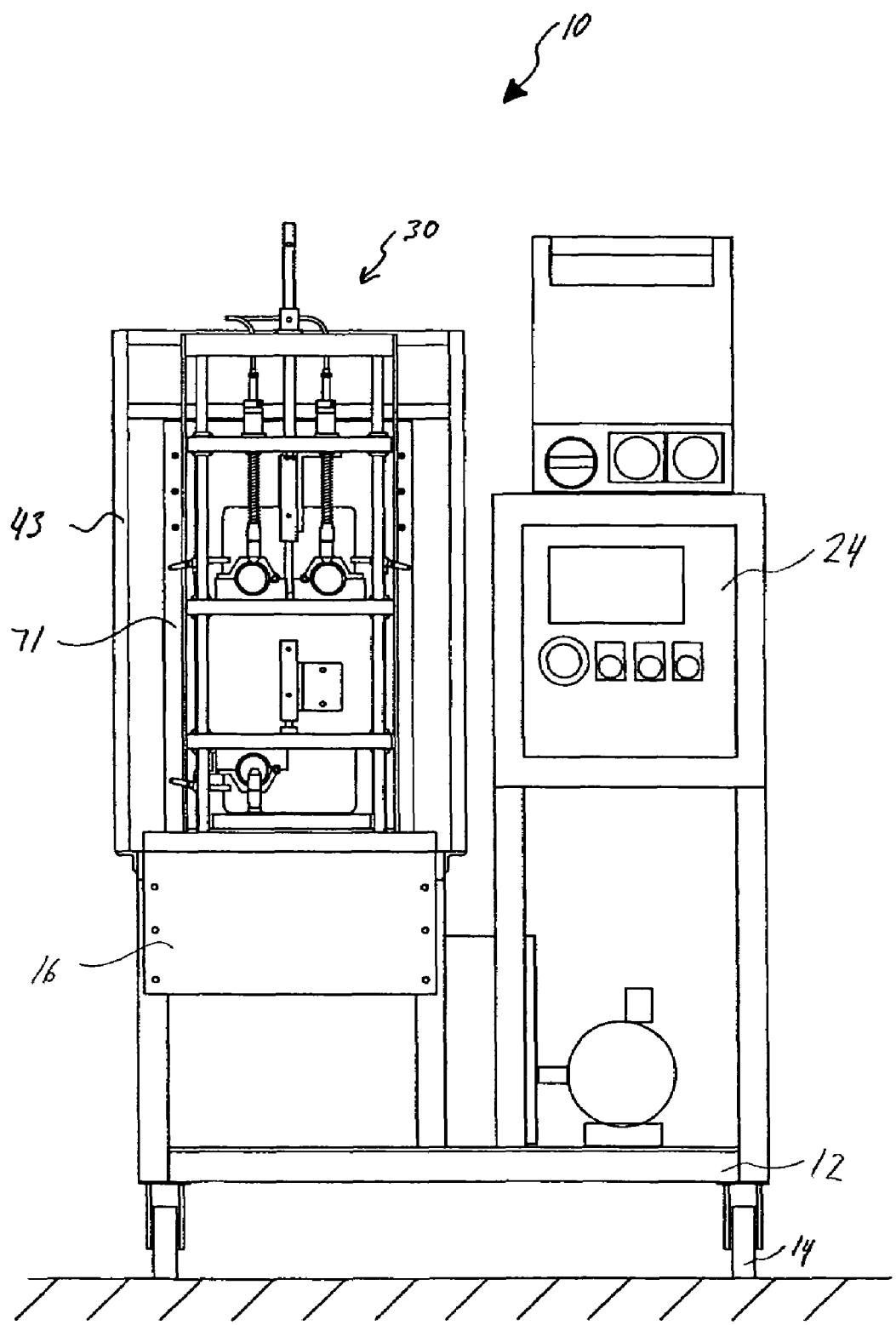
FIG. 2 is a front view of the mobile induction brazing apparatus shown in FIG. 1, with a portion of the induction coils removed for clarity.

Referring now to FIG. 2, a front view of the apparatus 10 is shown, with a portion of the brazing unit 70 removed for clarity. A user input, illustratively control panel 24, includes controls and indicators to allow an operator to control operation of brazing apparatus 10 and thereby braze a first component to a second component. An operator standing in front of quench water basin 16 can insert parts to be brazed into fixture 30 and operate control panel 24 from the front of apparatus 10.

Figure 3:
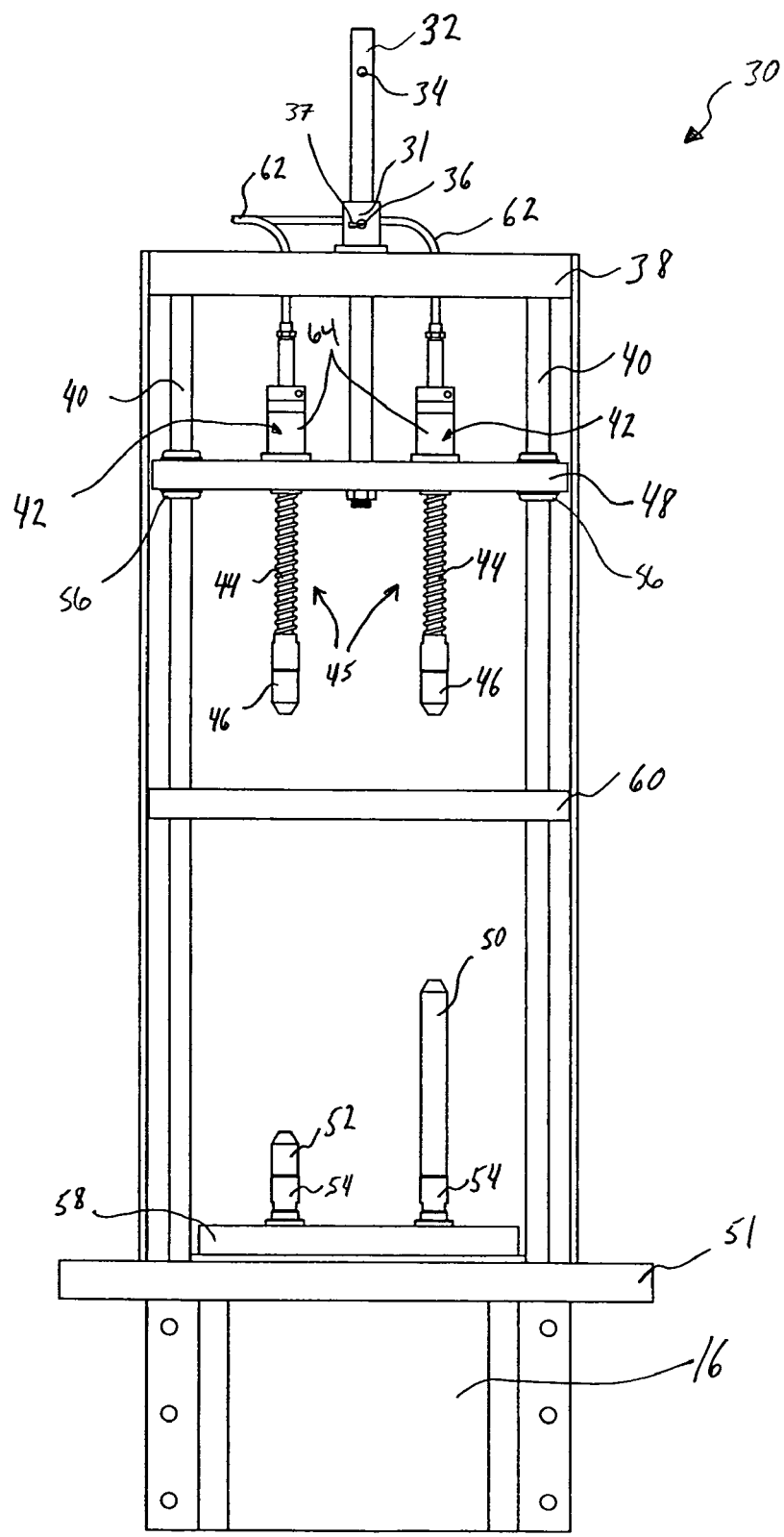
FIG. 3 is a partial front view of an illustrative embodiment fixture of the mobile induction brazing apparatus of FIG. 1.

Referring now to FIG. 3, a partial front view of one embodiment of fixture 30 is shown. Fixture 30 holds or positions the components or parts that are to be brazed within brazing apparatus 10. In one embodiment, fixture 30 is constructed of aluminum in order to reduce weight and improve the mobility of the apparatus 10. In alternative embodiments, fixture 30 can be constructed of steel, carbon fiber, or any other suitable rigid material. Fixture 30 includes a pair of support rods 40 which are coupled to crossbar 38 on an upper end and are coupled to crossbar 51 on a lower end. Rods 40 also pass through crossbar 60 which is positioned between crossbar 38 and crossbar 51. Upper holders 42 are supported by a crossbar 48, while a base 58 is positioned on crossbar 51 and supports lower holders 54. Upper holders 42 support upper posts 46, while lower holders 54 support removable lower posts 50 and 52. Lower posts 50, 52 cooperate with upper posts 46 to hold parts to brazed in the correct position. Lower holders 54 and lower posts 50, 52 include a central opening or passageway 55 (FIG. 6) that allows coolant to flow from the part being held to the quench water basin 16. As shown in FIG. 3, lower posts 50 and 52 have different lengths to accommodate parts having different dimensions. In other embodiments, lower posts 50 and 52 may have the same length, particularly when identical parts are supported on lower posts 50 and 52. As would be apparent to one having ordinary skill in the art, lower posts 50, 52 could be sized to correspond with a variety of part sizes.

Crossbar 48 supports bearings 56 which receive supports rods 40 for sliding movement vertically along rods 40 to raise and lower upper holders 42. Holders 42 each include an inlet tube 62 on an upper end and a shaft 45 which extends through an aperture (not shown) in crossbar 48. A coupler 64 connects inlet tube 62 with shaft 45. Upper posts 46 are positioned on the lower end of shafts 45 and are configured to slide vertically along shafts 45. Springs 44 are positioned over shafts 45 in between crossbar 48 and upper posts 46 to bias upper posts 46 downward. Crossbar 48 can be lowered until one of upper posts 46 contacts a part placed on one of the lower posts 50, 52. When upper post 46 contacts the part, crossbar 48 acts against spring 44 to force spring 44 to bias upper post 46 downward and hold the part securely during the brazing process. Each holders 42 includes a central opening or passageway 57 (FIG. 6) extending within shafts 45 and upper posts 46 that allows coolant to flow from tubes 62 to the part being brazed.

Crossbar 48 is held in place by rod 32 which extends through coupler 31 and crossbar 38 and is coupled to crossbar 48. Rod 32 includes apertures 34 that are aligned with aperture 36 in coupler 31 to position crossbar 48 at the appropriate height for the part assembly being brazed together. When the proper height is determined, a pin 37 is inserted into aperture 36 and one of the apertures 34 in rod 32 to secure crossbar 48 in the desired position. In alternative embodiments, a hydraulic cylinder and a linear actuator may be used to move and secure crossbar 48. To accommodate different part assemblies, or to facilitate component replacement or maintenance, the pin 37 in apertures 36 and 34 is removed and crossbar 48 is vertically moved to its desired position. A part assembly is loaded into the fixture 30 by forcing an upper end of the part assembly into engagement with the upper post 46 and pushing against the spring 44 to raise the post 46. Next, the lower end of the part assembly is pivoted into position on lower posts 50, 52. Upon releasing the part assembly, spring 44 is compressed to securely hold the part assembly in position for brazing.

Figure 4:
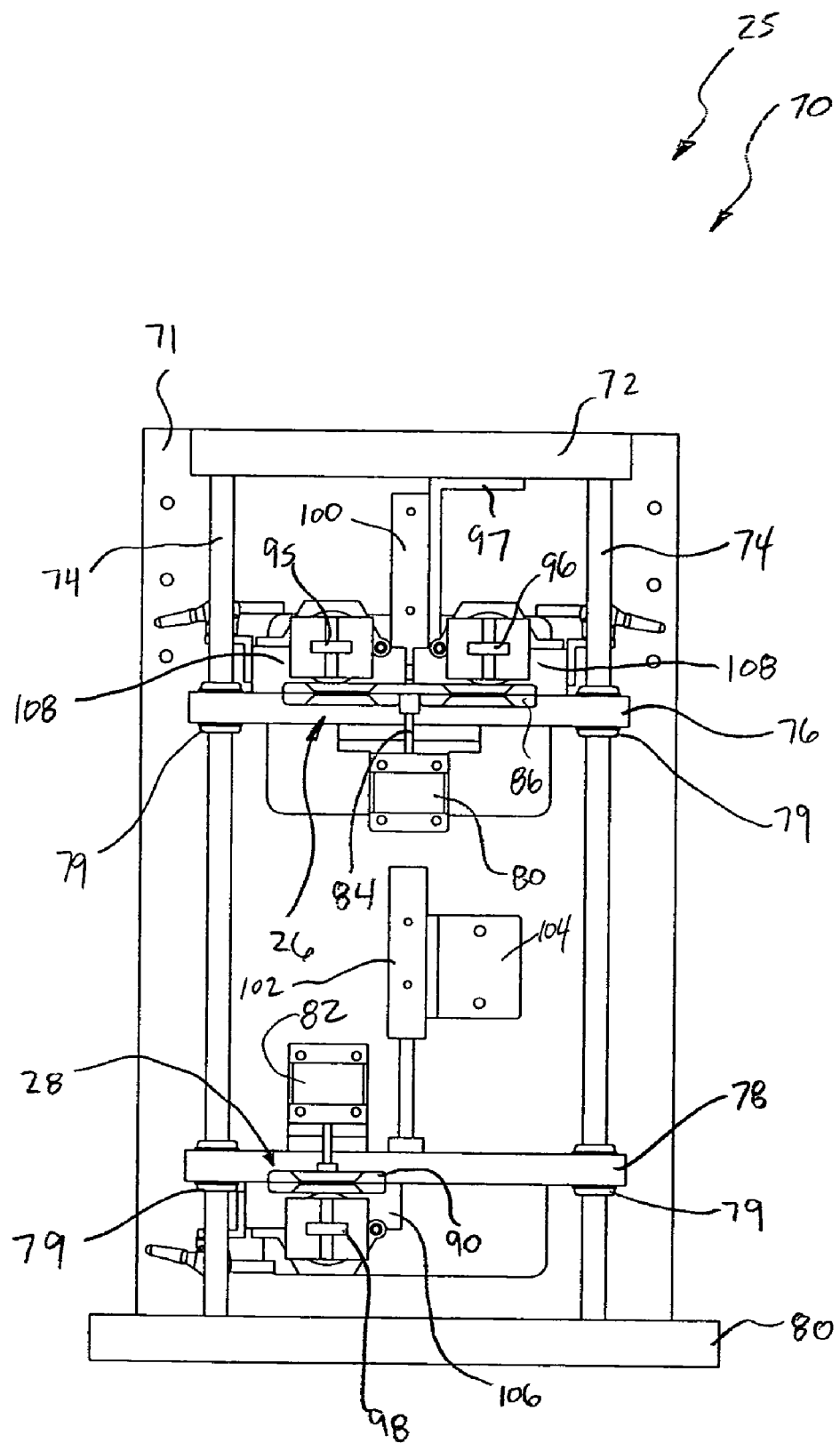
FIG. 4 is a front view of an illustrative embodiment operating assembly of the mobile induction brazing apparatus of FIG. 1.
Figure 5:
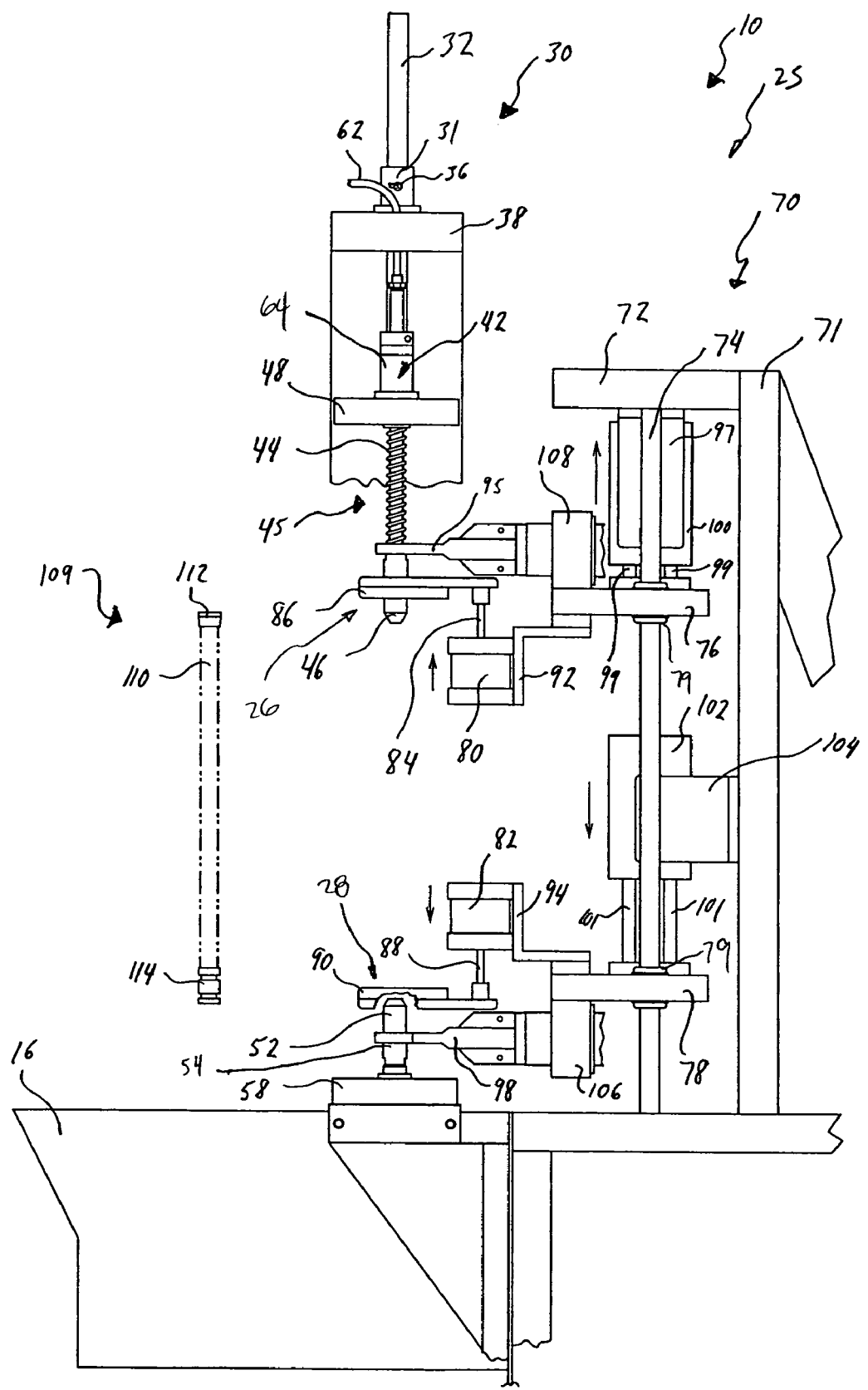
FIG. 5 is a right side view of the fixture and the operating assembly of the mobile induction brazing apparatus of FIG. 1, illustrating in phantom a part assembly positioned in spaced relation to the fixture, and further illustrating the operating assembly in a loading position, wherein the upper right induction coil and its corresponding components are removed for clarity.

Referring now to FIGS. 4 and 5, an illustrative embodiment operating assembly 25 is shown. Brazing unit 70 is coupled to quenching system 73 including upper and lower quenching applicators 26 and 28, respectively. Brazing unit 70 includes a lower base 80, an upper support 72, and a frame 71. Upper support 72 is coupled to lower base 80 by rods 74. Crossbars 76 and 78 support bearings 79 which receive rods 74 for sliding movement vertically along rods 74. Upper support 72 is coupled to bracket 97 which is coupled to a first positioning actuator, illustratively an upper primary cylinder 100. Upper primary cylinder 100 includes cylinder rods 99 which are coupled to crossbar 76. Upper left and upper right induction coils 95 and 96 are coupled to brackets 108 which are positioned on crossbar 76. The brackets 108 may include releasable clamps to facilitate removal, installation, and maintenance of the induction coils 95 and 96. A second positioning actuator, illustratively an upper secondary cylinder 80 is coupled to crossbar 76 and includes a cylinder rod 84 which is coupled to quenching applicator 85. On the lower end of brazing unit 70, bracket 104 is coupled to frame 71 and cylinder 102. A third positioning actuator, illustratively lower primary cylinder 102, includes cylinder rods 101 which are coupled to crossbar 78. Lower induction coil 98 is illustratively positioned directly below, and in alignment with, upper left induction coil 95 and coupled to bracket 106 which is coupled to crossbar 78. A fourth positioning actuator, illustratively lower secondary cylinder 82, is also coupled to crossbar 78 and includes a cylinder rod 88 which is coupled to quenching applicator 89. In this illustrative embodiment, cylinders 80, 82, 100, and 102 are air operated. As would be apparent to one having ordinary skill in the art, any suitable actuators, such as hydraulic cylinders or mechanical drives, could also be used.

As shown in FIGS. 5-11, a single part assembly 109 is inserted into fixture 30 of brazing apparatus 10. While in the following description, the illustrated part assemblies comprise faucet related components, such as delivery spouts and water supply tubes, it should be appreciated that the present invention is not limited thereto. Moreover, the present invention may find equal applicability with any component parts which may be coupled or joined through brazing.

Figure 6:
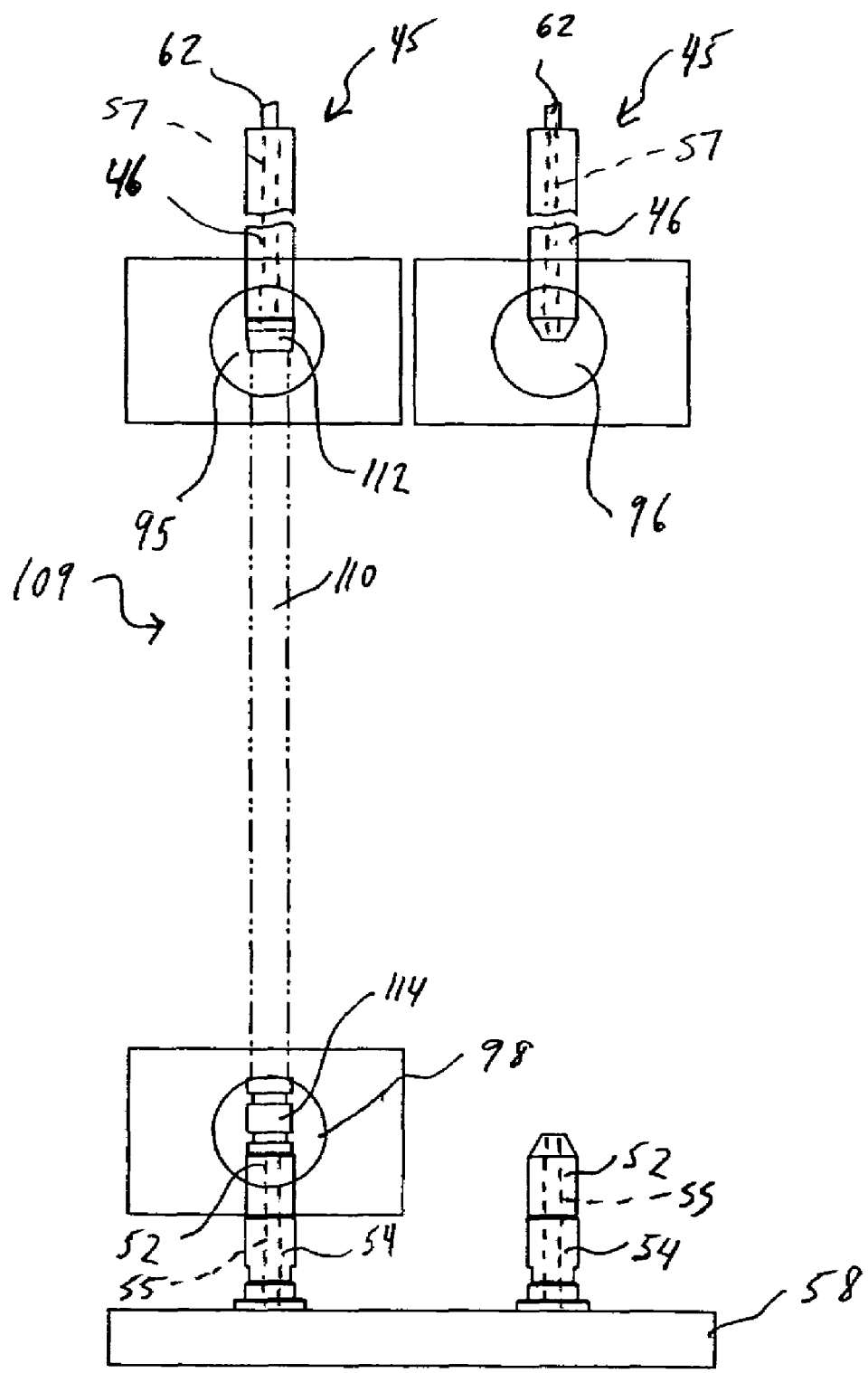
FIG. 6 is a partial front view of the fixture and the induction coils of the mobile induction brazing apparatus of FIG. 1, illustrating in phantom a part assembly inserted into the fixture in a loading position.
Figure 7:
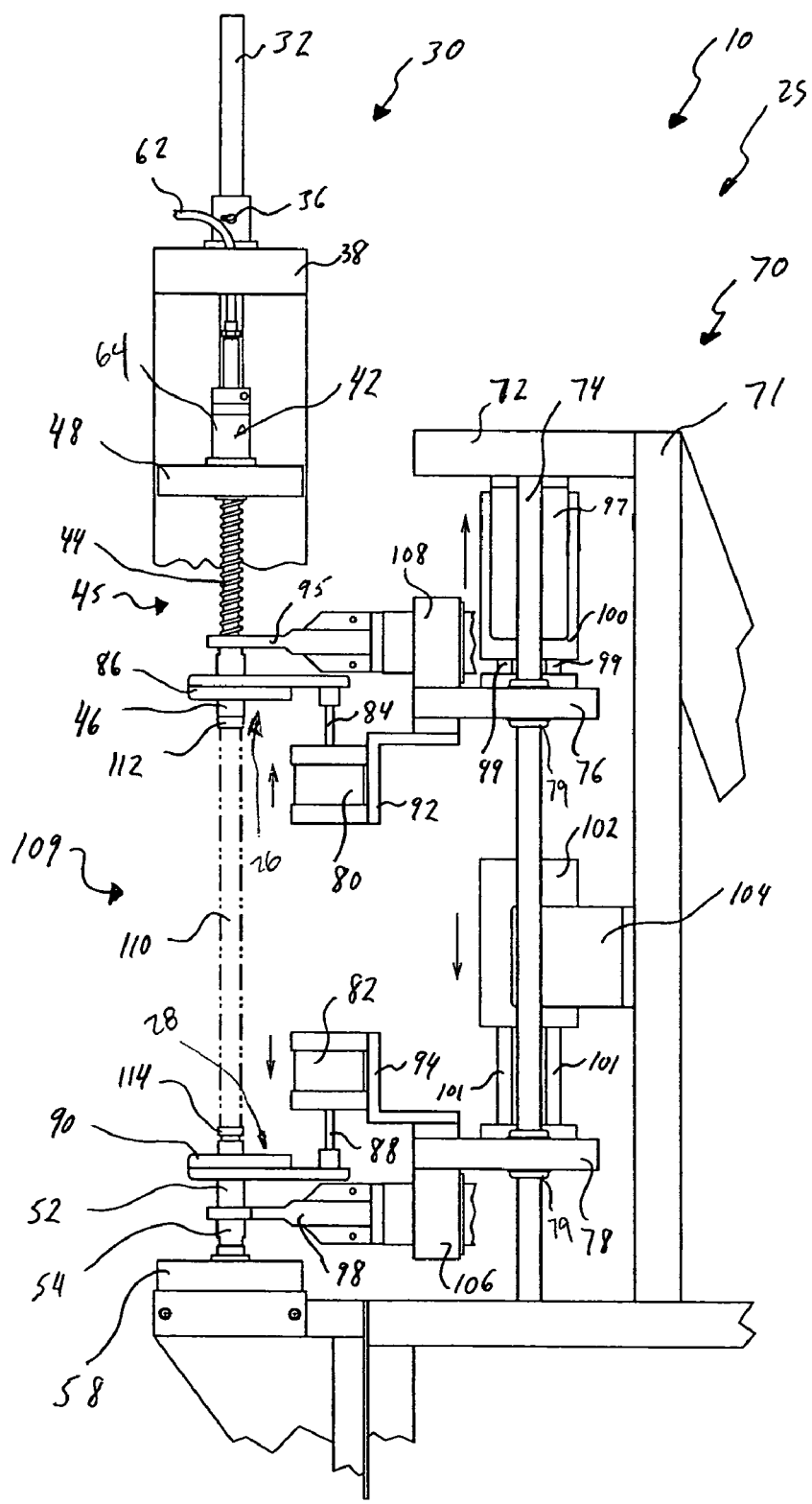
FIG. 7 is a right side view of the fixture and the operating assembly similar to FIG. 5, illustrating the operating assembly in a loading position.
Figure 9:
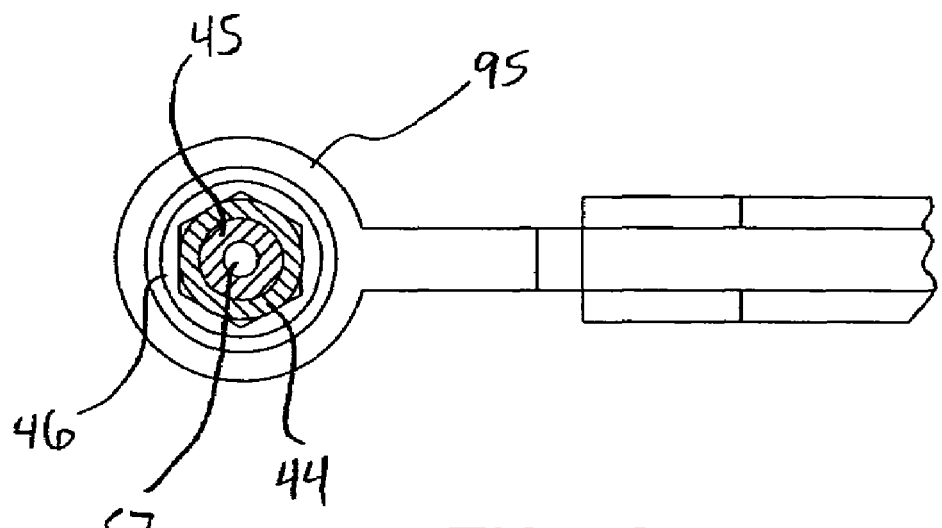
FIG. 9 is a view taken along line 9-9 of FIG. 8, showing the top of an upper induction coil.
Figure 10:
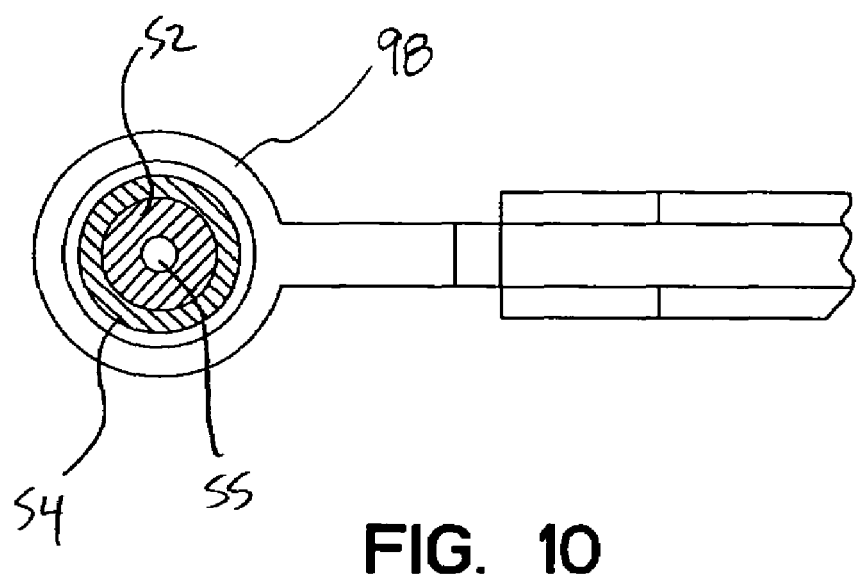
FIG. 10 is a view taken along line 10-10 of FIG. 8, showing the bottom of a lower induction coil.

FIGS. 5, and 7-8 and 11 are shown in profile view with upper right induction coil 96 and its corresponding components removed for simplicity. In this embodiment, a preassembled part assembly 109 that includes a tube 110, an upper fitting 112, and a lower fitting 114 is shown. An internal solder ring (not shown) is placed between the upper fitting 112 and tube 110 and the lower fitting 114 and tube 110. As shown in FIG. 6, upper right induction coil 96 and its corresponding holders are not used in this embodiment. In FIG. 7, part assembly 109 is shown positioned in the fixture 30 with the brazing unit 30 in the loading position. In the loading position, part assembly 109 is positioned so that fitting 112 contacts upper post 46 and pushes against spring 44, while fitting 114 rests on lower post 52. Force from the spring 44 causes the part assembly 109 to be secured in position between upper posts 46 and lower post 52. Cylinder rods 99 of cylinder 100 are retracted to position upper left induction coil 95 above part assembly 109. As shown in FIG. 9, induction coil 95 has an internal diameter greater than the outer diameter of springs 45 to allow spring 44 to pass through coil 95. When cylinder 100 is retracted, induction coil 95 is positioned above upper post 46 and around rod 45 and spring 44. In the loading position, cylinder rod 84 of cylinder 80 is extended to position quenching applicator 26 in a raised position close to induction coil 95, thereby facilitating access to upper post 46. Similarly on the lower end of brazing unit 70, cylinder rods 101 are extended from cylinder 102 to position induction coil 98 below part assembly 109 and around lower post 52. As shown in FIG. 10, lower induction coil 98 is similar to induction coil 95 and also has an internal diameter greater than the diameter of lower post 52 and lower holder 54 to allow post 52 and holder 54 to pass through coil 98. Also on the loading position, cylinder rod 88 of cylinder 82 is extended to position quenching applicator 28 in a lowered position close to induction coil 98, thereby facilitating placement of part assembly 109 on lower post 52.

Figure 8:
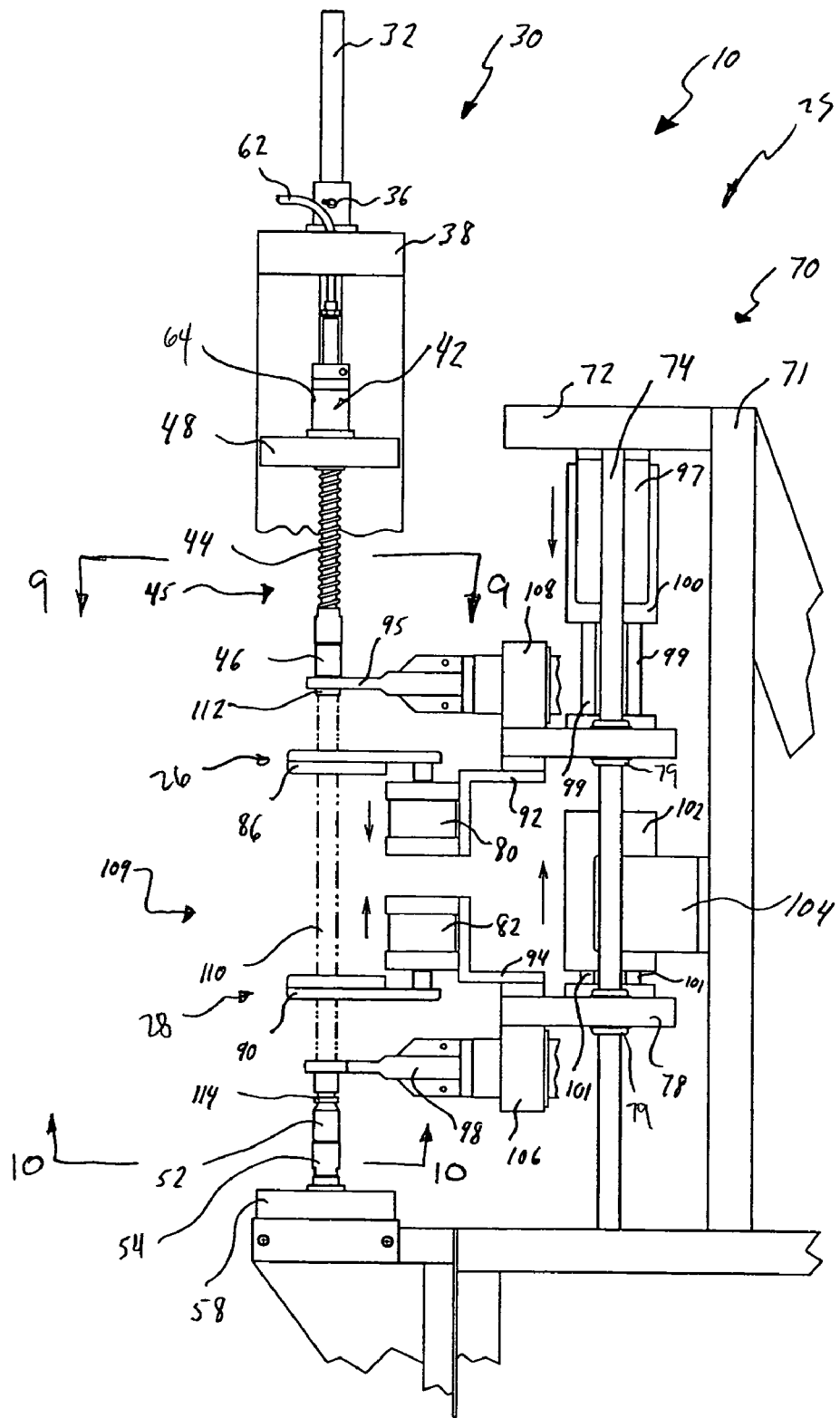
FIG. 8 is a right side view of the fixture and the operating assembly similar to FIG. 7, illustrating the operating assembly in a heating position.

In FIG. 8, operating assembly 25 is shown in the heating position. In this position, cylinder rods 99 of cylinder 100 are extended to position upper left induction coil 95 around tube 100 and fitting 112 at a position adjacent to the solder ring that is located between tube 110 and fitting 112. At the same time, cylinder rods 101 of cylinder 100 are retracted to position lower induction coil 98 around tube 110 and fitting 114 at a position adjacent to the solder ring that is located between tube 110 and fitting 114. During the heating step, upper post 46 and lower post 52 which contact upper and lower part assembly 109 are electrically grounded to ground part assembly 109. Induction coils 95 and 98 are then charged with electricity. Induction coil 95 heats fitting 112 which melts the internal solder ring to solder fitting 112 and tube 110 together. Similarly, induction coil 98 heats fitting 114 which melts the internal solder ring to solder fitting 114 and tube 110 together. Cylinders 80 and 82 remain retracted during the heating step. Nozzles 86 and 90 of quenching applicators 26 and 28 are positioned directly below and above the heated portions of part assembly 109, respectively.

Figure 11:
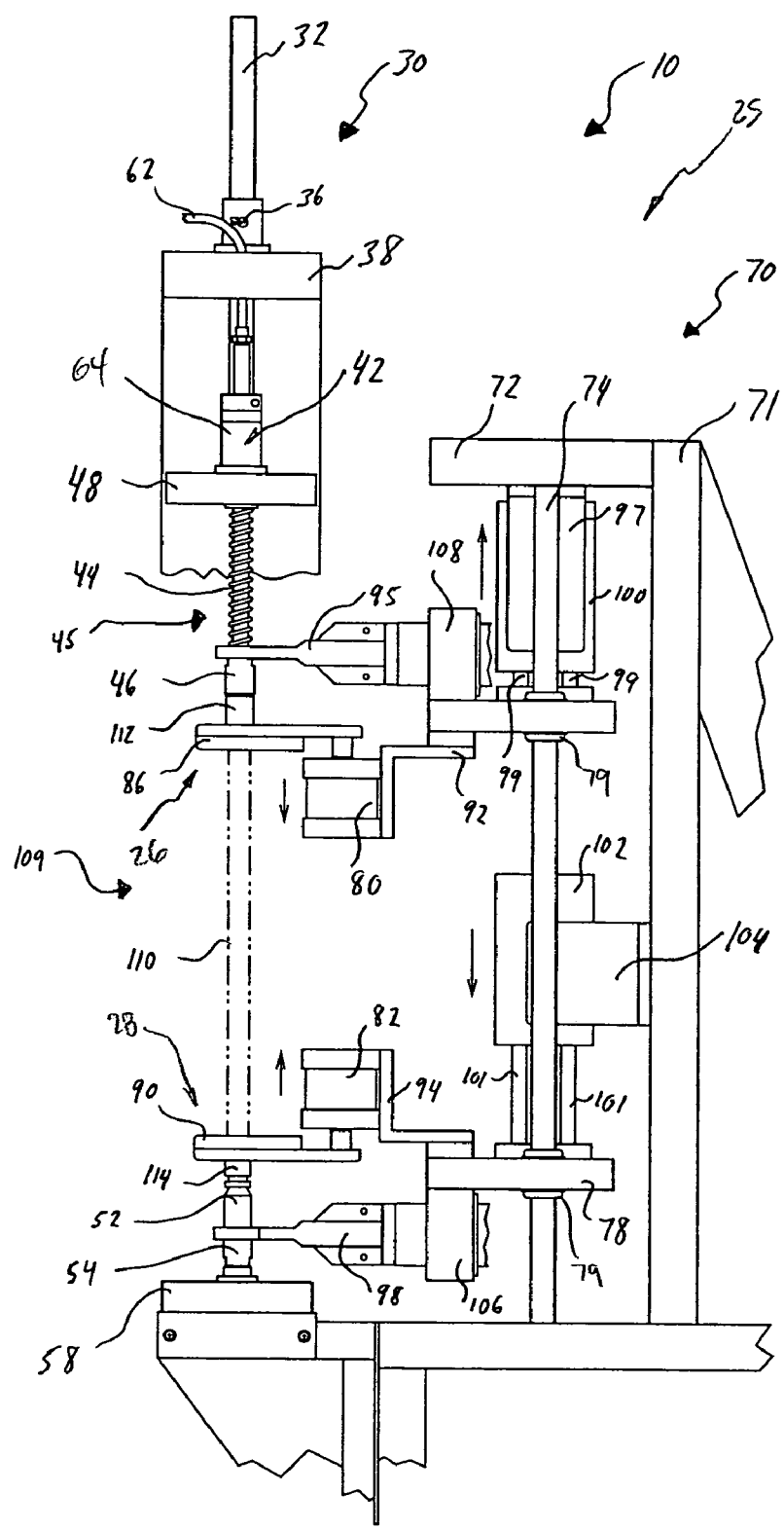
FIG. 11 is a right side view of the fixture and the operating assembly similar to FIG. 7, illustrating the operating assembly in a quenching position.

In FIG. 11, operating assembly 25 is shown in the quenching position. In this position, cylinder rods 99 of cylinder 100 are retracted to position induction coil 98 above upper post 46 and to position quenching applicator 26 around fitting 112. Simultaneously, cylinder rods 101 of cylinder 102 are retracted to position induction coil 98 below lower post 52 and to position nozzle 90 around fitting 114 and the area heated by induction coil 98 in the heating step. Coolant is then applied to fitting 112 and tube 110 at the location that was heated by induction coil 98 through nozzle 86. Simultaneously, coolant is applied to fitting 114 and tube 110 by nozzle 90 of quenching applicator 28. Coolant also passes through the interior region of part assembly 109. Coolant flows from tube 62 through passageway 57 of shaft 45 and upper post 46 to part assembly 109, and then through passageway 56 of lower post 52, and holder 54 and into quench water basin 16. The control system for the brazing apparatus 10, along with the quenching applicators 26 and 28, are explained in more detail below.

Figure 12:
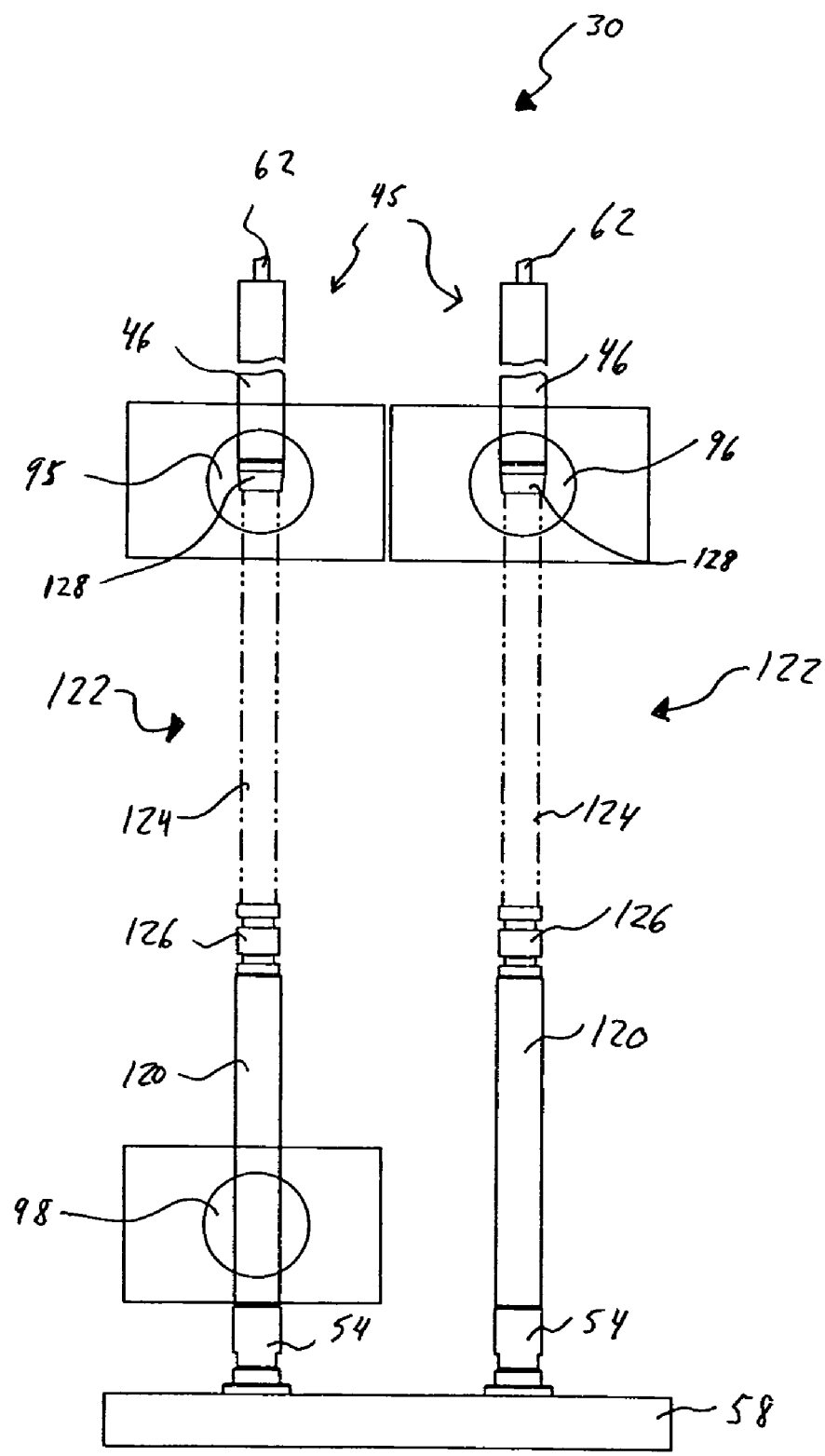
FIG. 12 is a partial front view of the fixture and the induction coils of the mobile induction brazing apparatus of FIG. 1, illustrating in phantom a pair of part assemblies inserted into the fixture in a loading position and supported by extended lower posts.

As shown in FIG. 12, in an alternative embodiment of fixture 30 and part assembly 122, lower posts 52 are replaced by extended lower posts 120. In this embodiment, brazing apparatus 10 functions similarly to the previous embodiment with the exception that two part assemblies 122 can be brazed simultaneously rather than a single part assembly 109, and only the upper end of part assemblies 122 are brazed instead of both the upper and lower ends of part assembly 109. Both upper induction coils 95 and 96 are used in this embodiment, while lower induction coil 98 is inactive. In this embodiment, extended lower posts 120 are received by holders 54 of base 58 and fixture 30 is configured to hold a pair of part assemblies 122. Each part assembly 122 includes a lower fitting 126, a tube 124, and an upper fitting 128. An internal solder ring (not shown) is placed between the tube 124 and the upper fitting 128. Upper induction coils 95 and 96 braze fittings 128 to tubes 124, while lower induction coil 98 remains inactive.

Figure 13:
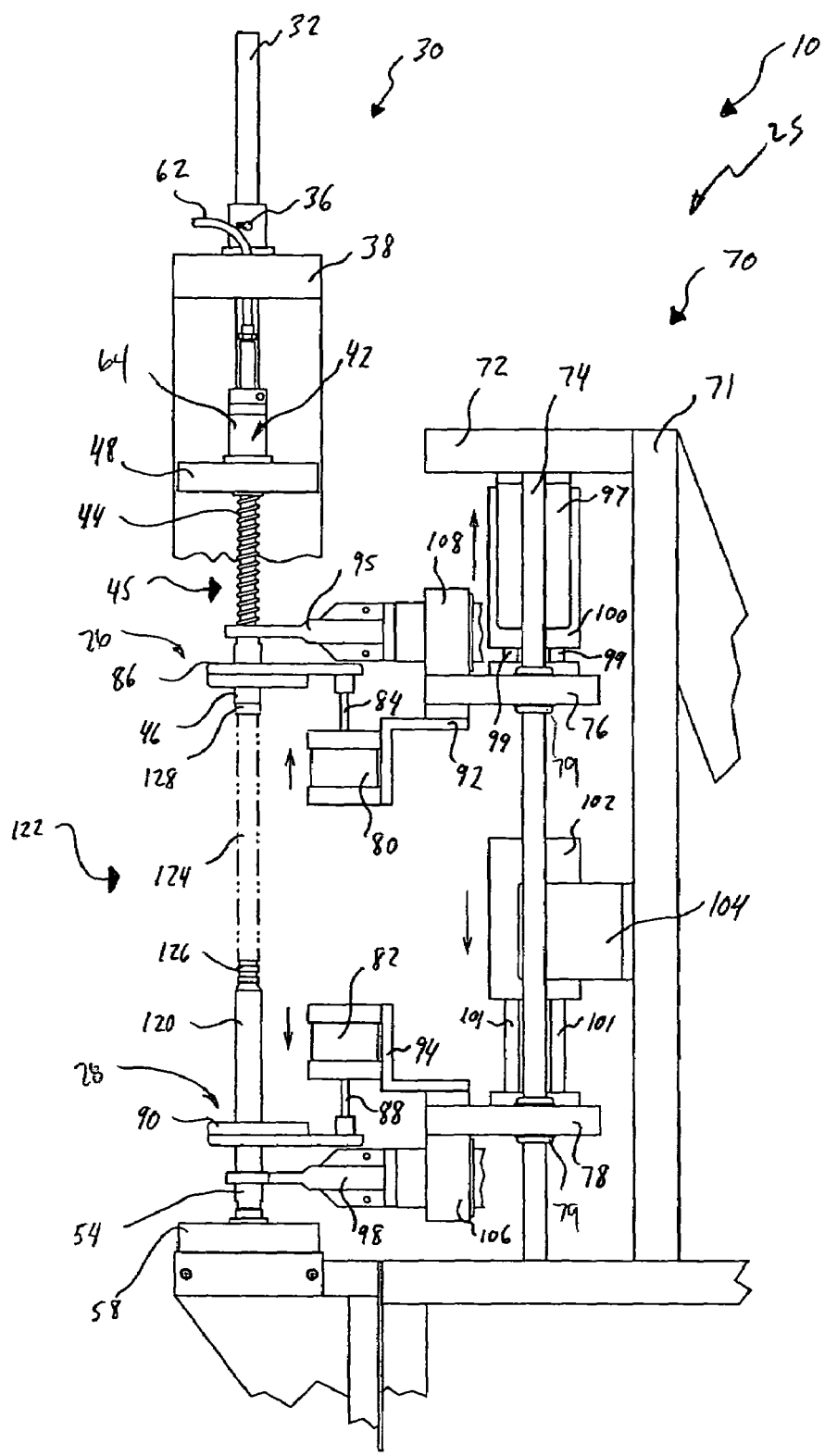
FIG. 13 is a right side view of the fixture and the operating assembly similar to FIG. 5, illustrating in phantom one of the part assemblies of FIG. 10 inserted into the fixture and supported by one of the extended lower posts, and further illustrating the operating assembly in a loading position, wherein the upper right induction coil and its corresponding components are removed for clarity.

In FIG. 13, operating assembly 25 is shown in the loading position. As discussed above, FIGS. 13-15 are shown in profile view with upper right induction coil 96 and its corresponding components removed for simplicity. In use, induction coil 96 and its corresponding components perform the same steps as induction coil 95. In the loading position, cylinder 102 is extended to position crossbar 78 and lower induction coil 98 below part assemblies 122. Cylinder 82 is also extended to position quenching applicator 28 in a lowered position adjacent induction coil 98. Cylinder 100 is retracted to position upper induction coils 95 and 96 above upper posts 46 thereby facilitating placement of part assemblies 122 between upper posts 46 and extended lower posts 120. Cylinder 80 is also extended move quenching applicator 26 to a position to allow access to load the part assemblies 122.

Figure 14:
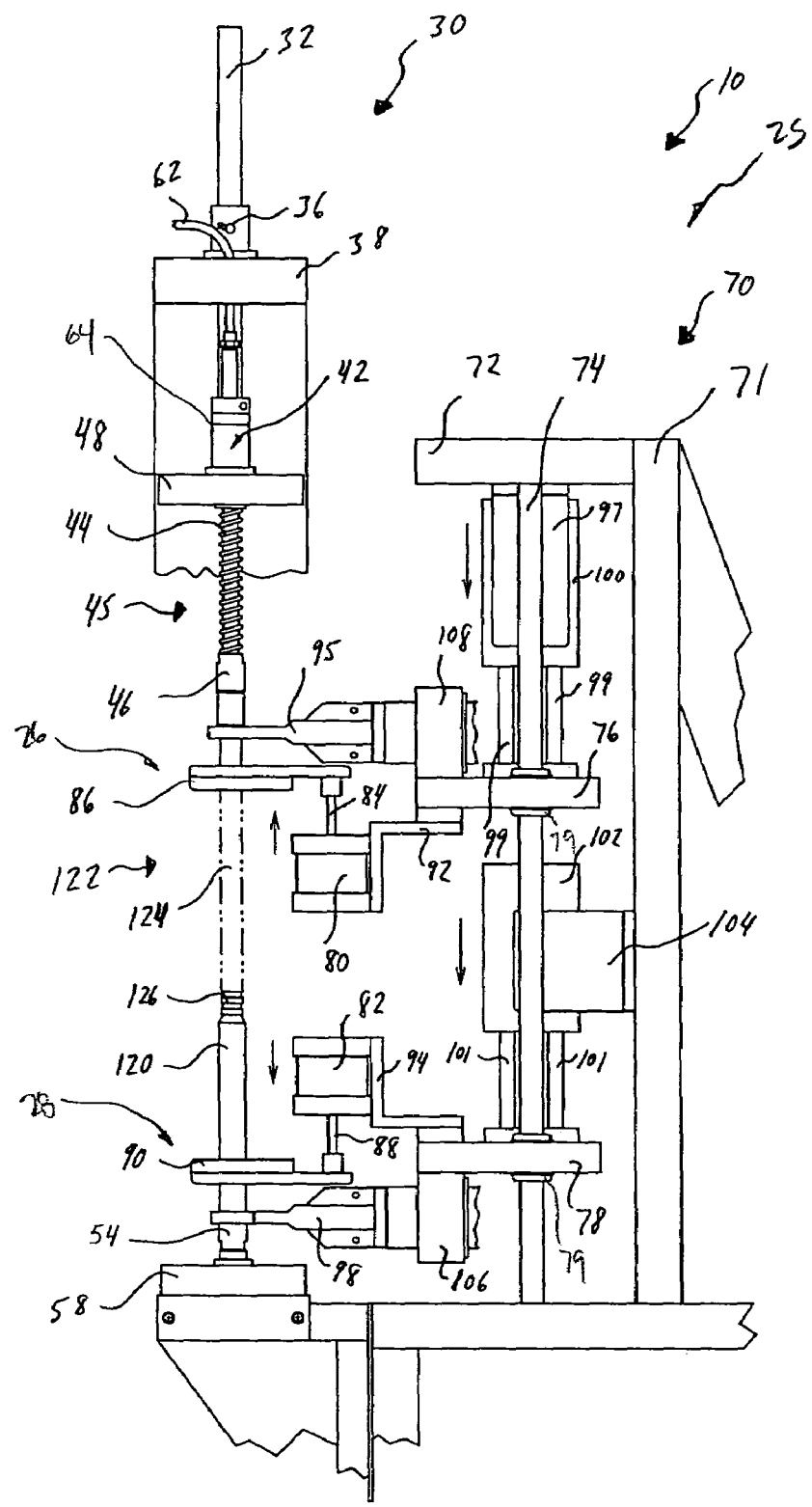
FIG. 14 is a right side view of the fixture and the operating assembly similar to FIG. 13, illustrating the operating assembly in a heating position.

In FIG. 14, operating assembly 25 is shown in the heating position. Cylinder 100 is extended to position upper induction coils 95 and 96 around fittings 128 of part assemblies 122. Current is then applied to coils 95 and 96 while part assemblies 122 remain electrically grounded through contact with upper posts 46 and extended lower posts 120. Induction coils 95 and 96 create enough heat in tubes 124 and fittings 128 to melt the internal solder ring placed between them.

Figure 15:
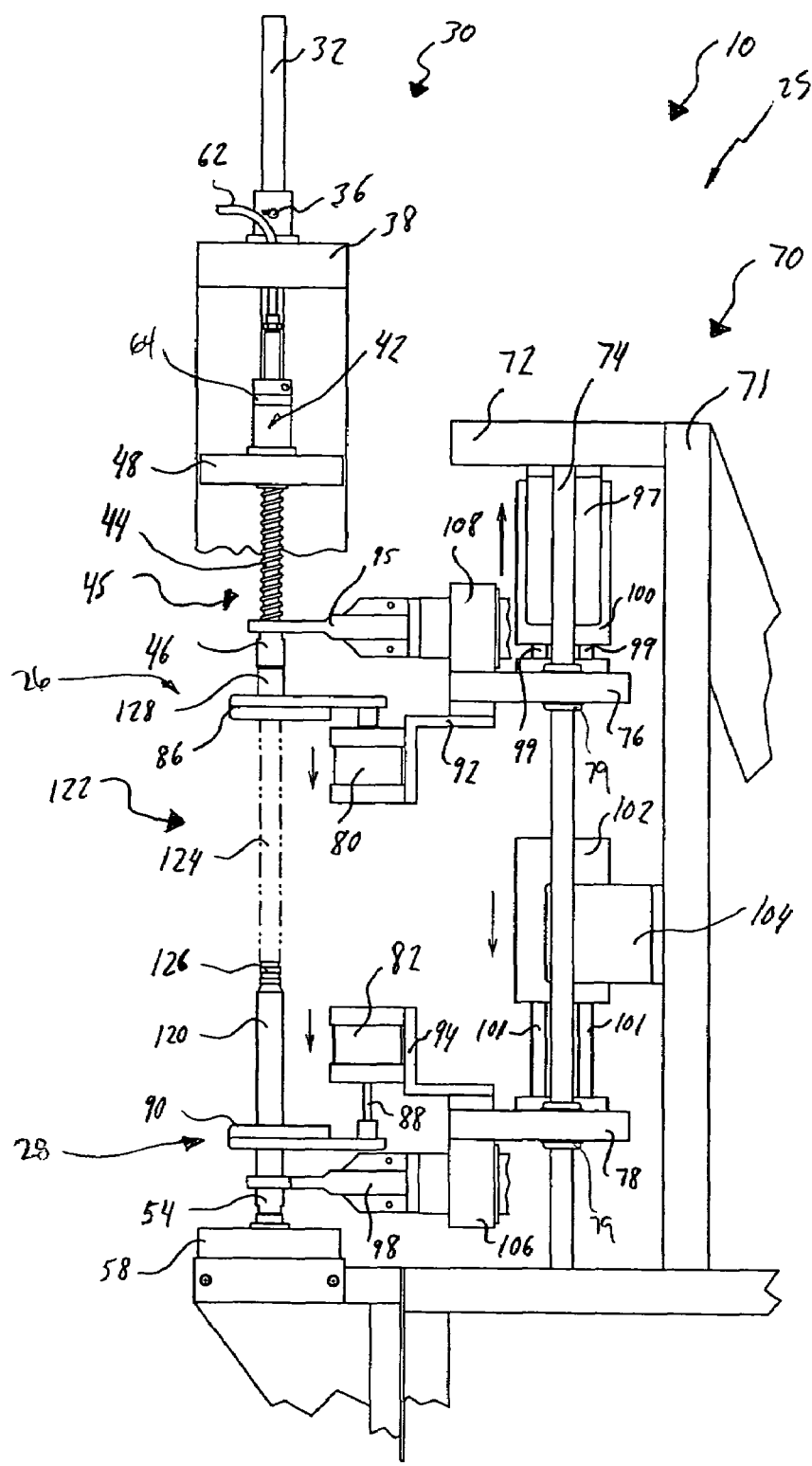
FIG. 15 is a right side view of the fixture and the operating assembly similar to FIG. 13, illustrating the operating assembly in a quenching position.

In FIG. 15, operating assembly 25 is shown in the quenching position. Cylinder 100 is retracted to position upper induction coils 95 and 96 above upper posts 46, and cylinder 80 is retracted to position quenching applicator 26 around fittings 128 and the heated portions of tube 124. A coolant is then applied to the heated portions of part assemblies 122 by nozzles 86. Coolant also passes through the interior region of part assemblies 122. More particularly, coolant flows from tube 62 through each shaft 45 and upper post 46 to part assemblies 122, and through extended lower posts 120, holders 54, and base 58 into quench water basin 16.

Figure 17:
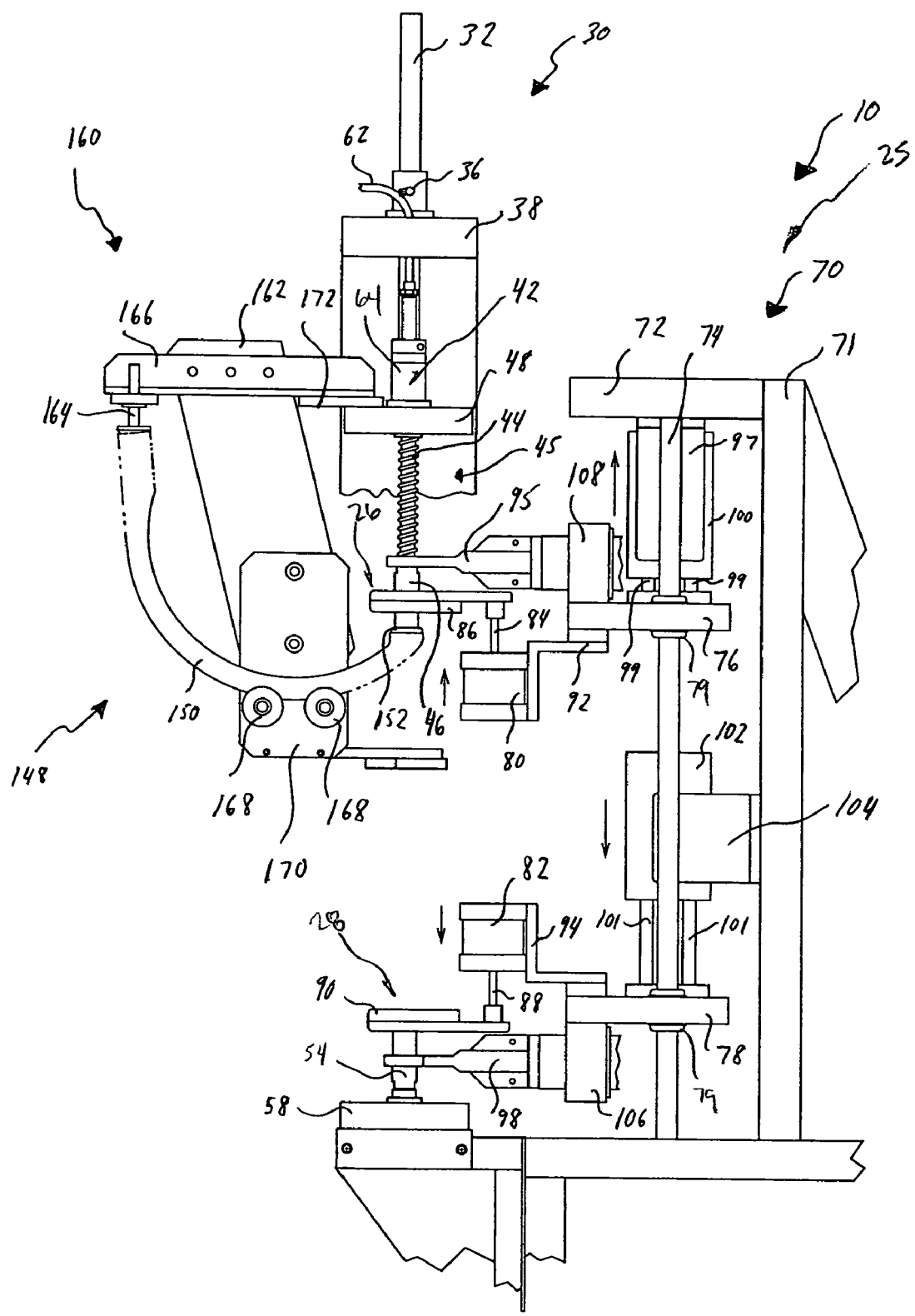
FIG. 17 is a right side view of the fixture and the operating assembly similar to FIG. 5, illustrating in phantom one of the part assemblies of FIG. 16 inserted into the fixture and supported by one of the upper posts and a substructure, and further illustrating the operating assembly in a loading position, wherein the upper right induction coil and its corresponding components are removed for clarity.
Figure 18:
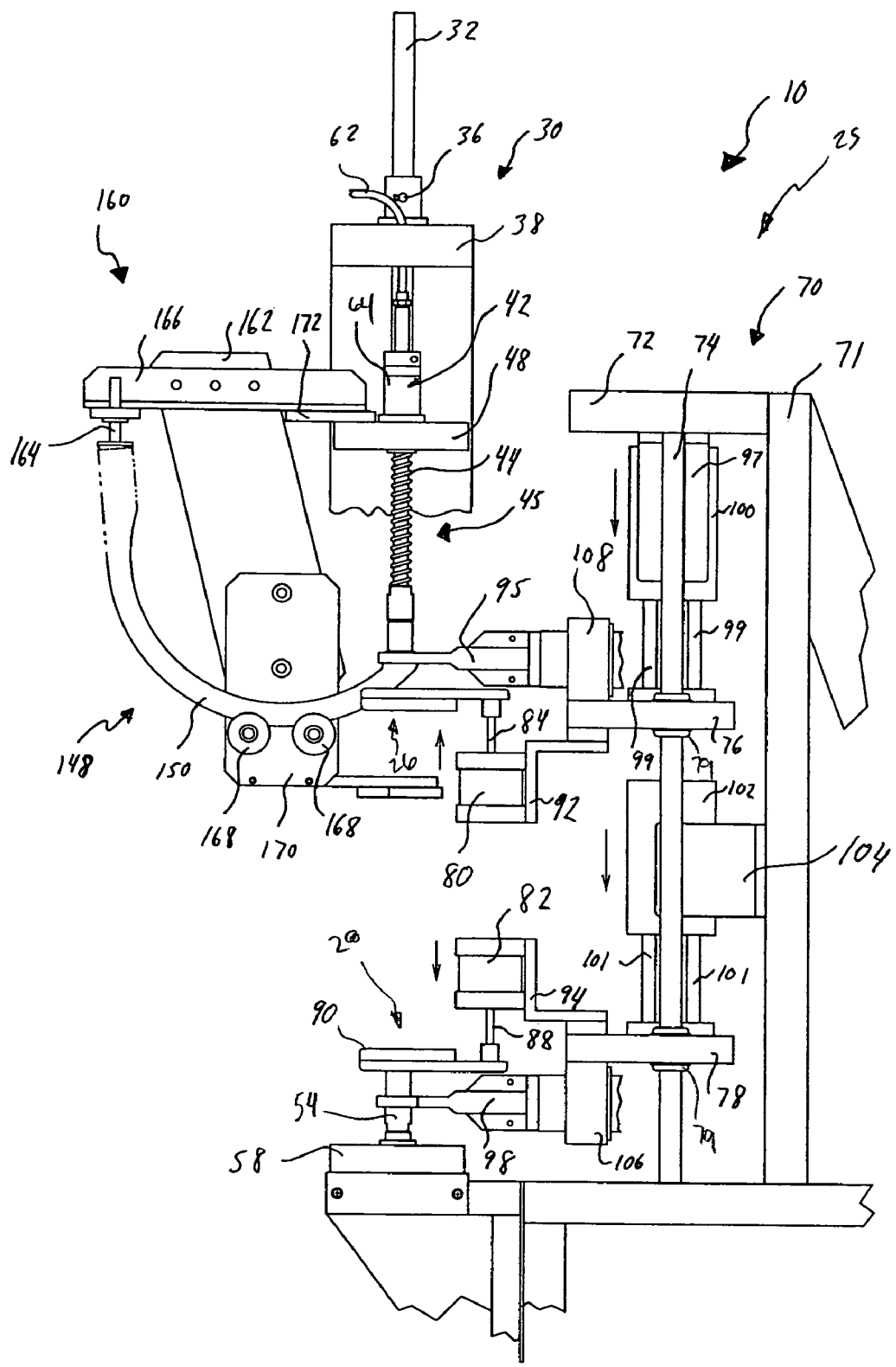
FIG. 18 is a right side view of the fixture and the operating assembly similar to FIG. 17, illustrating the operating assembly in a heating position.
Figure 19:
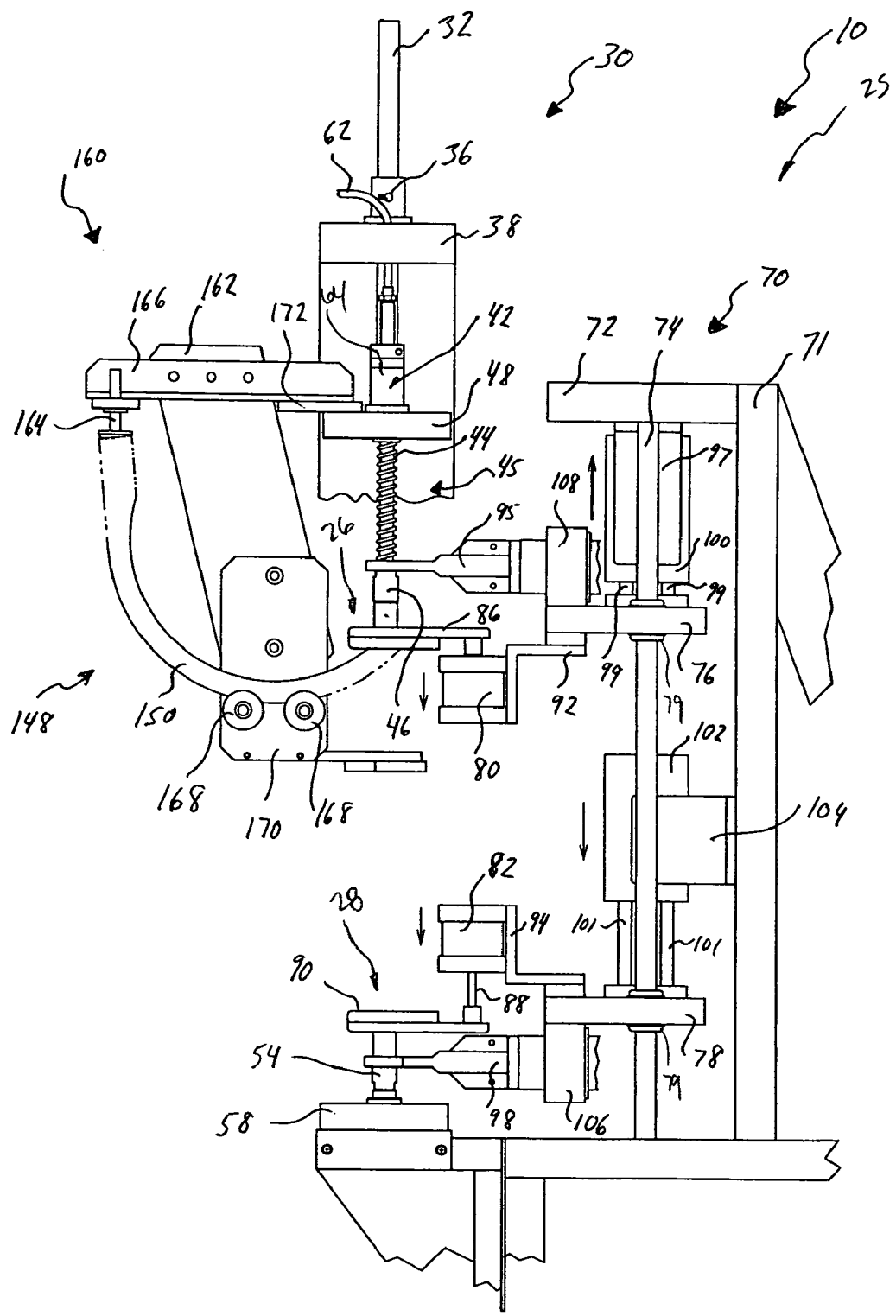
FIG. 19 is a right side view of the fixture and the operating assembly similar to FIG. 17, illustrating the operating assembly in a quenching position.
Figure 20:
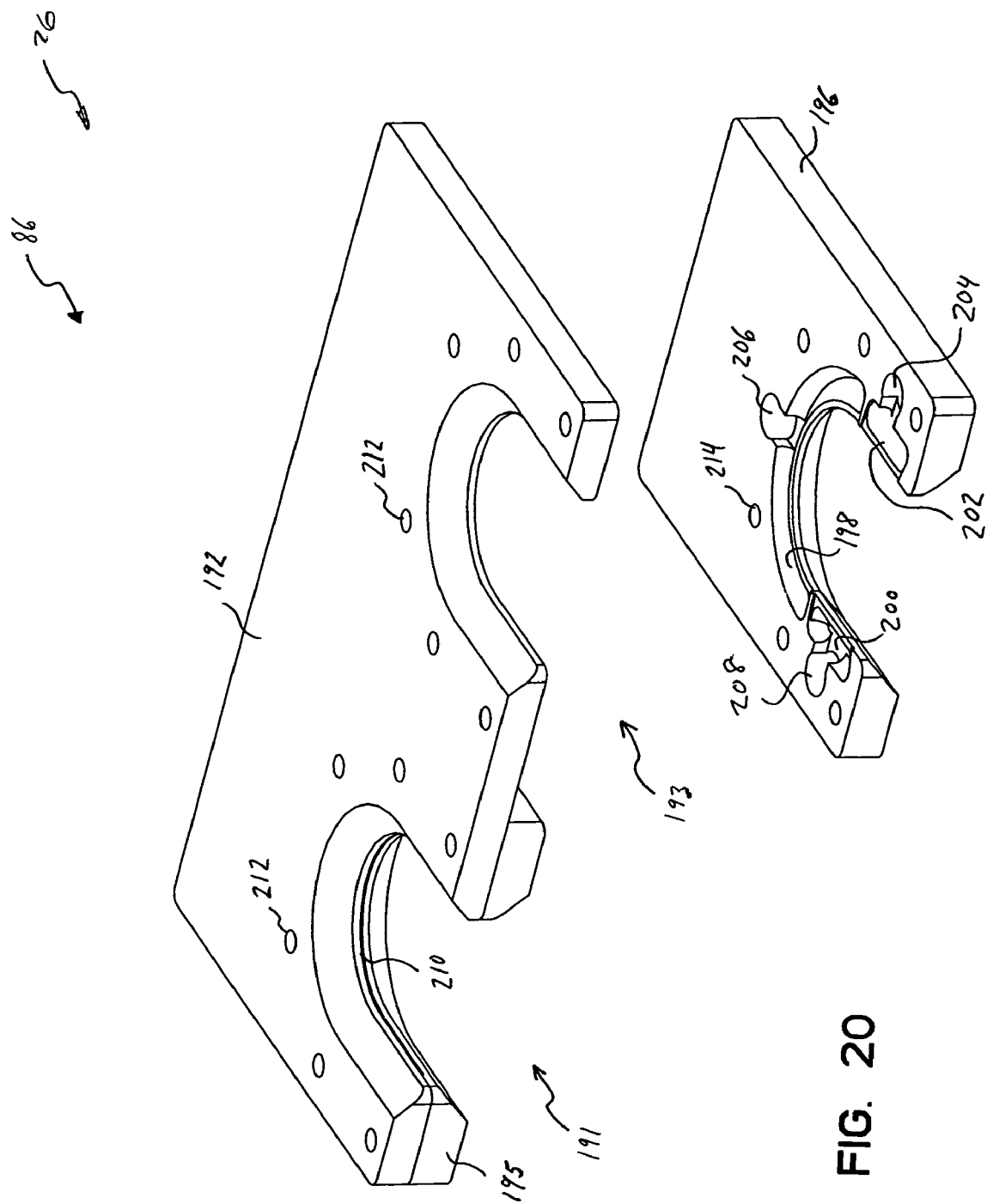
FIG. 20 is a partially exploded perspective view of an illustrative embodiment quenching applicator of the mobile induction brazing apparatus of FIG. 1.

Another alternative embodiment of fixture 30 and part assembly 148 is shown in FIGS. 16-19. In this embodiment, the lower end of fixture 30 is not used during the brazing process of part assemblies 148. As shown in FIG. 16, part assemblies 148 are supported by upper posts 46. As discussed above, FIGS. 17-19 are shown in profile view with upper right induction coil 96 and its corresponding components removed for simplicity. In use, induction coil 96 and its corresponding components perform the same steps as induction coil 95. In this embodiment, brazing apparatus 10 functions similarly to the previous embodiment with the exception that coolant is not supplied by tubes 62 to the interior of part assemblies 148. As shown in FIG. 17, in this embodiment, part assemblies 148 have a semicircular profile. Fixture 30 includes substructures 160 which support the upper ends of part assemblies 148. While only the substructure 160 corresponding to coil 95 is shown in FIGS. 17-19, the substructure 160 associated with coil 96 is substantially identical thereto. Substructure 160 includes a bracket 172, a base 166, and a pair of vertical supports 162. Vertical supports 170 include rollers 168 which support the curved portion of part assemblies 148. Holders 164 are supported by base 166 and couple to the upper portion of tubes 150. In this configuration, fixture 30 is configured to hold a pair of part assemblies 122. Each part assembly 148 includes a fitting 152 and a tube 150. An internal solder ring is also placed between the tube 150 and the fitting 152. Lower induction coil 98 is inactive in this configuration, while upper induction coils 95 and 96 braze fittings 152 to tubes 150.

In FIG. 17, operating assembly 25 is shown in the loading position. Cylinder 100 is retracted to position induction coils 95 and 96 (not shown) above upper posts 46, thereby facilitating placement of part assemblies 148 between upper posts 46, rollers 168, and holders 164. Cylinder 80 is also extended move quenching applicator 26 to a position to facilitate access to load the part assemblies.

In FIG. 18, operating assembly 25 is shown in the heating position. Cylinder 100 is extended to position induction coils 95 and 96 around fittings 152 of part assemblies 148. Current is then applied to coils 95 and 96 while part assemblies 148 remain electrically grounded through contact with upper posts 46 and holders 164. Induction coils 95 and 96 create enough heat in each tube 150 and fitting 152 to melt the solder ring previously placed between them.

In FIG. 19, operating assembly 25 is shown in the quenching position. Cylinder 100 is retracted to position induction coils 95 and 96 above upper posts 46, and cylinder 80 is retracted to position quenching applicator 28 around fittings 152 and the heated portions of tube 150. A coolant is then applied to the heated portions of part assemblies 148 by nozzles 86. In this embodiment, coolant is applied only by nozzles 86 and does not flow through the internal space of part assemblies 148.

Figure 21:
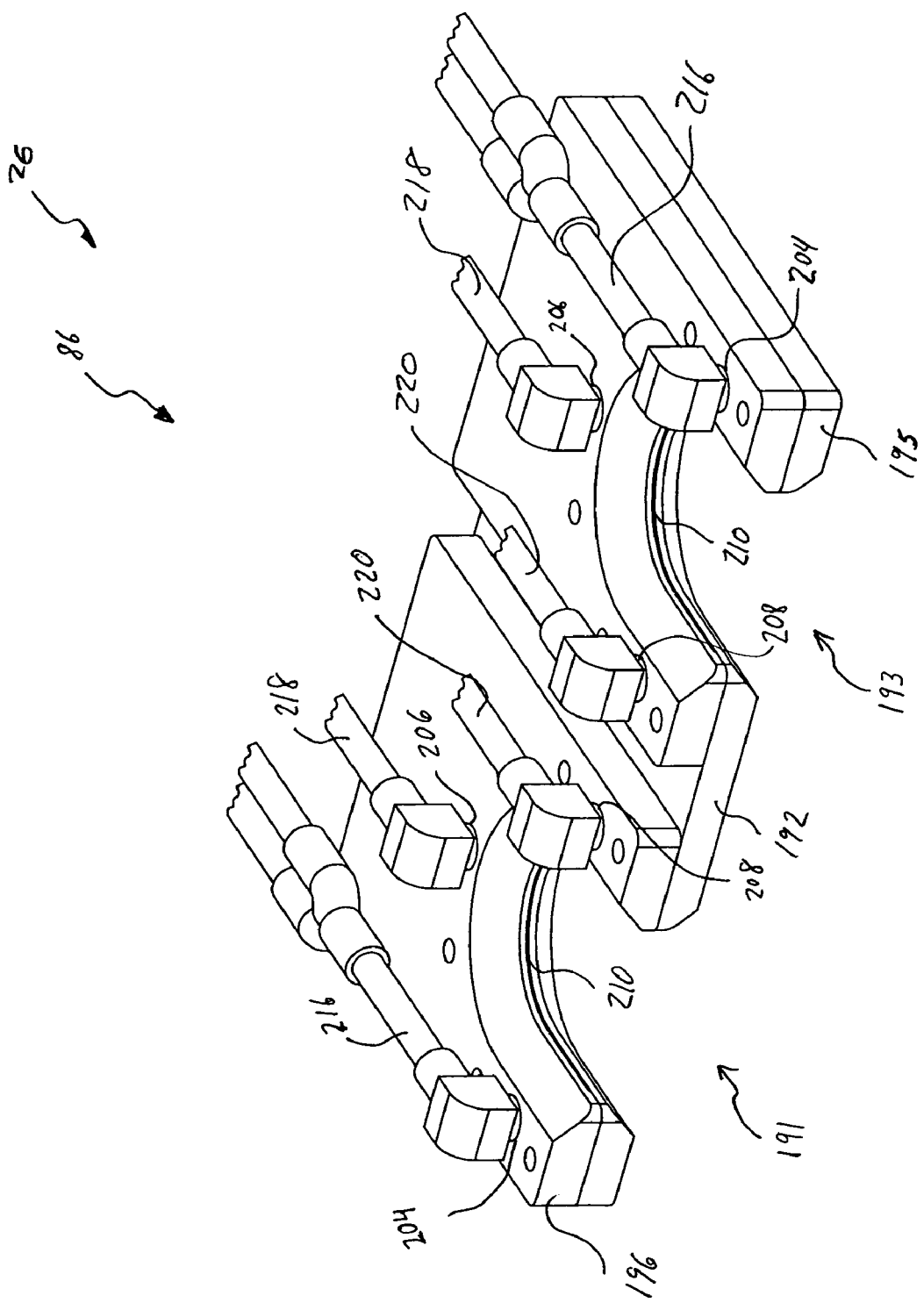
FIG. 21 is a perspective view of the quenching applicator of FIG. 20, illustrating coolant supply lines coupled to the nozzles.
Figure 22:
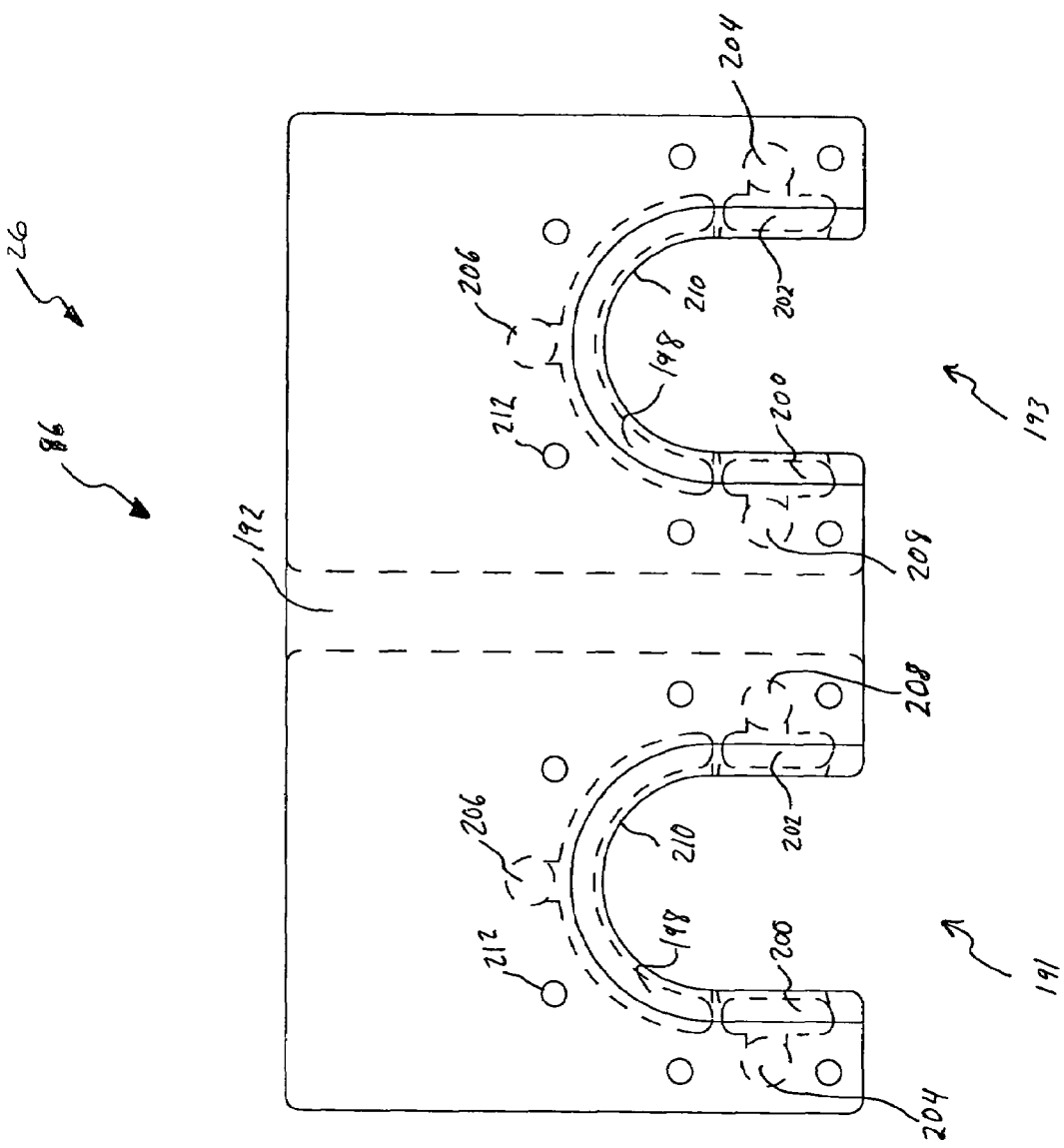
FIG. 22 is a top plan view of the quenching applicator of FIG. 20.
Figure 23:
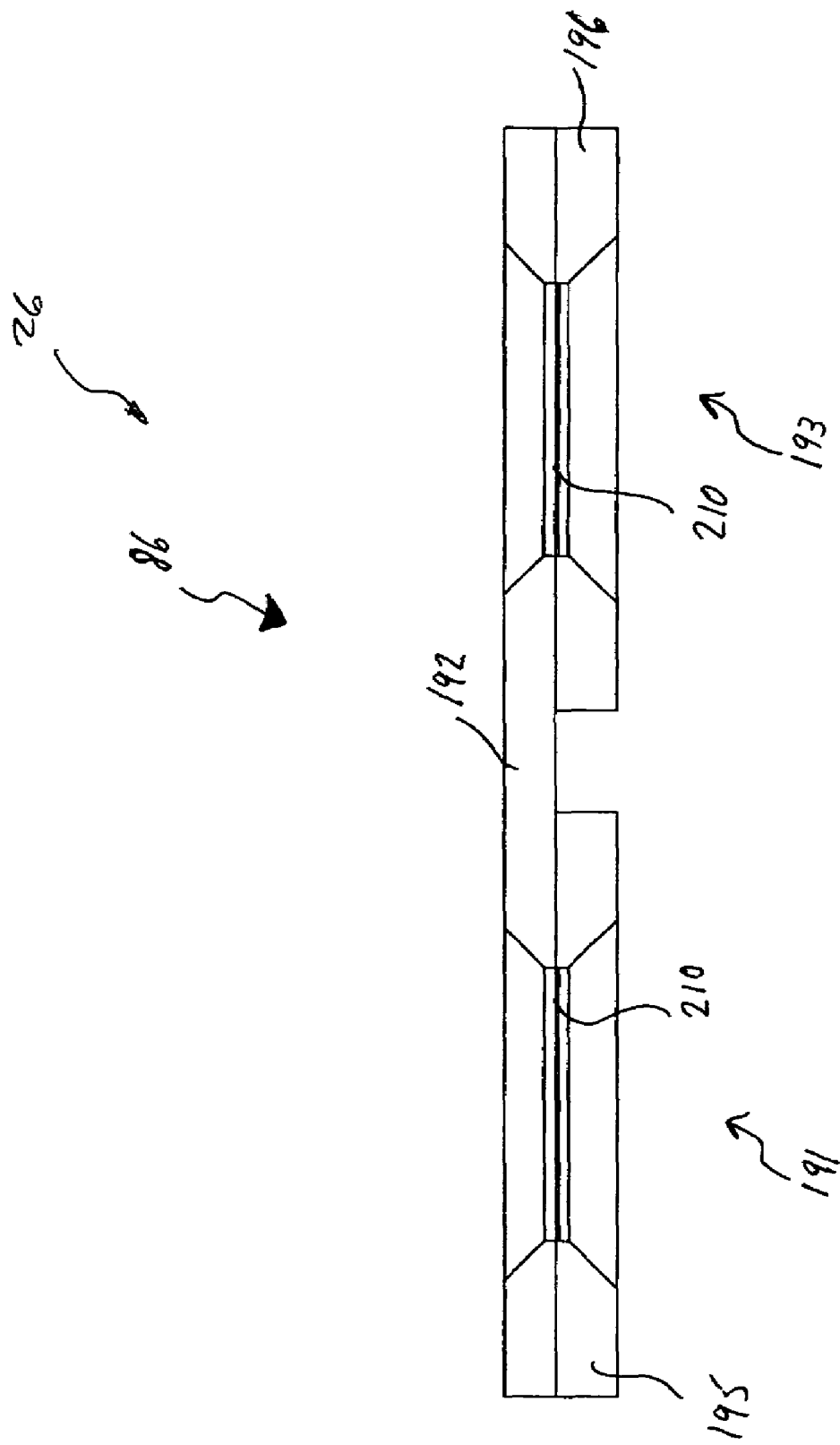
FIG. 23 is a side elevational view of the quenching applicator of FIG. 20.

One illustrative embodiment of quenching applicator 26, including nozzles 86, of brazing apparatus 10 is shown in FIGS. 20-23. It should be noted that the quenching applicator 28 is substantially the same as quenching applicator 26 except for including only a single nozzle 90 as opposed to a pair of nozzles 86. Nozzles 86 include a left nozzle 191 and a right nozzle 193. Upper plate 192 of nozzles 86 is coupled to lower plates 195 and 196 to form nozzles 191 and 193. Apertures 212 and 214 in upper plate 192 and lower plates 195 and 196 receive fasteners (not shown) to couple the plates together. Nozzles 191 and 193 are U-shaped to be positioned substantially around a part assembly during the quenching process. The U-shape of nozzles 191 and 193 allows for round or curved parts to be fixtured, brazed, and cooled without requiring that the parts be moved from a brazing station to a separate cooling station. Channels 198, 200, and 202 in lowers plates 195 and 196 receive coolant from ports 206, 208, and 204, respectively. As shown in FIG. 21, coolant supply lines 216 are coupled to ports 204, coolant supply lines 218 are coupled to ports 206, and coolant supply lines 220 are coupled to ports 208. As shown in FIG. 23, channels 200, 202, and 204 in lower plates 195 and 196 include a slightly recessed outer edge that forms the U-shaped portion of lower plates 195 and 196. A gap 210 is formed between upper plate 192 and lower plates 195 and 196 when lower plates 195 and 196 are coupled to upper plate 192. As pressurized coolant is supplied to channels 198, 200, and 202, coolant exits the left and right nozzles 191 and 193 through gap 210 and is applied evenly to all sides of a part assembly positioned within the U-shaped nozzles. Nozzle 90, which is positioned on the lower end of brazing unit 70 is similar to nozzle 86 with the exception that it includes only a single nozzle rather than left and right nozzles 191 and 193. In alternative embodiments, nozzle 90 includes left and right nozzles. The U-shaped internal porting design is configured to spray coolant in a manner similar to a continuous cooling ring.

Figure 24:
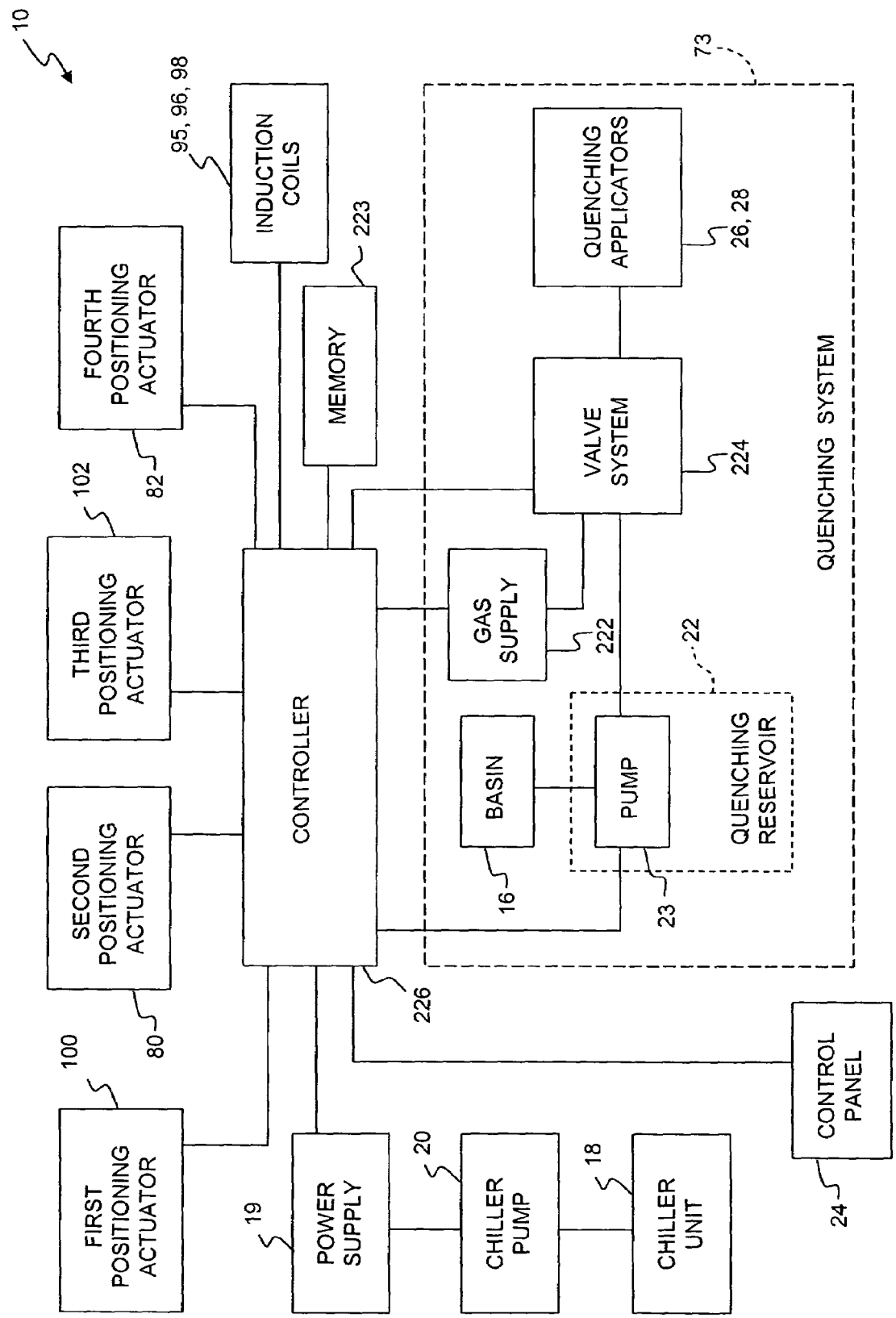
FIG. 24 is a block diagram illustrating communication between a controller and various operating components of the mobile induction brazing apparatus of FIG. 1.

As shown in FIG. 24, in one illustrative embodiment of the quenching system 73 of brazing apparatus 10, both air and water are used as coolant to quench a part assembly brazed by brazing apparatus 10. Air is provided by a gas supply 222, such as an air compressor, while water is supplied by the quenching reservoir 22. Both the gas supply 222 and the quenching reservoir 22 are in fluid communication with a valve system 224. Additionally, each nozzle 90, 191 and 193 is independently ported such that the flow rates of fluid from gas supply 227 and quenching reservoir 22 to each port 204, 206, and 208 may be independently adjusted by valve system 224 in order to facilitate uniform cooling of the brazed part.

A controller 226 controls operation of the valve system 224 and is in communication with memory 228 and control panel 24. As such, a user may input desired heating and quenching criteria through control panel 24, which the controller 226 stores in memory 228 for subsequent access. In one illustrative embodiment, the memory 228 is configured to store a plurality of different control schemes, or instructions, corresponding to a plurality of different part assemblies. Each control scheme is configured to independently instruct the controller of the desired position of induction coils 96, 96, 98 and quenching applicators 26, 28, in order to provide the heating and quenching operations, respectively, at the proper locations on the part assembly. More particularly, controller 226 controls positioning actuators 80, 82, 100, 102 in order to move induction coils 95, 96, 98 and quenching applicators 26, 28. Controller 226 also controls operation of the induction coils 95, 96, 98 in response to instructions of the control schemes stored in memory 228. More particularly, the controller 226 determines the heating temperatures, application times, and duration. Similarly, the control scheme from memory 228 instructs the controller 226 to control operation of quenching reservoir 22, gas supply 222, and valve system 224 in order to provide the proper quenching application times, duration, and coolant to quenching applicators 26, 28.

In this embodiment, high pressure air (approximately 25-30 psi) is blown through the interior of the part assembly being quenched and through the nozzles 86 and/or 90 immediately after the induction coils 95, 96 have brazed the part assembly. The high pressure air sets up the solder within the part assembly. The time period of the high pressure air is user selectable through control panel 24. After a predetermined time period, high pressure water is used instead of air as the coolant. Water at about 30 psi is pushed through the interior of the part assembly being quenched and through the nozzles 86 and/or 90 immediately after the air quenching process. The water coolant is applied for a user selectable time period. Air is initially used to cool the part assembly in order to avoid solder fractures which may occur if a part assembly is cooled too quickly, unevenly, or impacted with water when the solder is molten. The air cooling phase allows the solder to solidify after which water cools the part assembly so it may be safely handled by an operator.

Generally, the water is applied until the part is cool enough to be safely removed from brazing apparatus 10 by hand. After the high pressure water quench step, controller 226 actuates air supply 222 to provide low pressure air (about 4-8 psi) to the nozzles 86, 90 to purge any remaining water droplets from the nozzles 86, 90. The low pressure air is applied continuously to the nozzles 86, 90 except during the quenching process. Continuous application of the low pressure air to the nozzles 86, 90 prevents water droplets from collecting in the nozzles 86, 90. Water droplets left in the nozzles 86, 90 could inadvertently be sprayed onto the part assembly during the high pressure air step of the quenching process and cool the part assembly unevenly.

The valve system 224 may include a plurality of independently controlled valves configured to be controlled by the controller 226 to control the flow of coolant to a brazed part assembly. For example, the controller 226 may be used to control the type of coolant applied to the brazed part assembly. In one illustrative embodiment as detailed herein, air and water are sequentially applied, while in an alternative embodiment air and water are simultaneously applied. Illustratively, the controller 226 includes programmable logic controllers (PLC's) which are used to control the timing of the steps of the quenching process. As would be apparent to one having ordinary skill in the art, any suitable controller could be used.

In one embodiment, the controller 226 for brazing apparatus 10 has the ability to store and retrieve specific heating and cooling parameters from memory 228 for a user specified part assembly. A user can input a part assembly identification number into control panel 24 of brazing apparatus 10. When the controller 226 receives the input, it retrieves heating and cooling parameters and settings previously stored in memory 226 for the specified part assembly. The controller 226 then uses this information to automatically configure and control brazing and quenching apparatus 10 for brazing the specified part assembly. The user can quickly change part assemblies by changing the part assembly identification number using control panel 24. For example, controller 226 may retrieve a first scheme from memory 228 for heating and cooling parameters and settings for part assembly 109 of FIGS. 5-11, a second scheme from memory 228 for heating and cooling parameters and settings for part assembly 122 of FIGS. 12-15, and a third scheme from memory 228 for heating and cooling parameters and settings for part assembly 148 of FIGS. 16-19.

Brazing apparatus 10 includes quick-disconnect fittings that allow a user to easily move brazing apparatus 10 and prepare it for use. In one embodiment, brazing apparatus 10 includes an electrical connection to provide power to the apparatus, a water supply and return to supply the chiller for the power unit on the apparatus, and a compressed air supply. As would be apparent to one having ordinary skill in the art, any suitable connection fitting could be used for the electrical, water, and air connections. In one embodiment, the quench water basin 16 is sized to hold enough water to last through an 8 hour shift. In alternative embodiments, a water supply line is provided in the quench water basin to continuously provide quench water.

Although the invention has been described in detail with reference to certain preferred embodiments, variations and modifications exist within the spirit and scope of the invention as described and defined in the following claims.

The invention claimed is:

1. An apparatus for brazing a first component and a second component together, the apparatus comprising:
   a fixture configured to support the first and second components, the first and second components being coupled together as a part assembly, the part assembly including a fluid conduit passing through the first and second components;
   an induction coil supported for movement relative to the fixture and configured to braze the first component to the second component;

a closed-loop quenching system including a quenching applicator supported for movement relative to the fixture and configured to supply at least one coolant to the first and second components, the coolant being recirculated through the closed-loop quenching system;
a frame supporting the fixture, the induction coil, and the closed-loop quenching system; and
a plurality of rollable members supporting the frame, the plurality of rollable members permitting the movement of the frame, the fixture, the induction coil, and the closed-loop quenching system as a mobile, self-contained apparatus for brazing a first component and a second component together.

2. The apparatus of claim 1, wherein the rollable members are casters.

3. The apparatus of claim 1, further comprising a power supply coupled to the induction coil.

4. The apparatus of claim 3, further comprising a closed loop heat exchanger system configured to cool the power supply.

5. The apparatus of claim 1, wherein the quenching applicator includes a nozzle configured to supply coolant to the first and second components.

6. The apparatus of claim 5, wherein the coolant is one of a gas and a liquid.

7. The apparatus of claim 5, wherein the nozzle is substantially U-shaped.

8. The apparatus of claim 1, further comprising a controller including a first control scheme and configured to control operation of the quenching applicator, a gas supply coupled to the quenching applicator, and the induction coil to braze the first and second components together.

9. The apparatus of claim 8, wherein the controller is a programmable logic controller.

10. The apparatus of claim 8, further comprising a user input coupled to the controller and configured to receive input from an operator selecting one of a plurality of control schemes.

11. The apparatus of claim 1, further comprising a second induction coil positioned in spaced relation to the first induction coil.

12. The apparatus of claim 1, wherein the first and second components are preassembled and include a solder ring configured to braze the first and second components together.

13. The apparatus of claim 1, further comprising a quick-disconnect coupler configured to couple at least one of an electrical supply, a liquid supply, and a gas source to the apparatus.

14. The apparatus of claim 1, wherein the coolant is a liquid coolant and the closed-loop quenching system further includes a quench liquid basin, a quench liquid reservoir, and a recirculating pump.

15. The apparatus of claim 1, further comprising a gas supply coupled to the quenching applicator.

16. An apparatus for brazing a first component and a second component together, the apparatus comprising:
a fixture configured to support the first and second components;
an induction coil supported for movement relative to the fixture and configured to braze the first component to the second component;
a quenching applicator supported for movement relative to the fixture and configured to supply at least one coolant to the first and second components;
a gas supply coupled to the quenching applicator;
a liquid reservoir,
a recirculation pump in fluid communication with the quenching applicator and the liquid reservoir,
a liquid basing in fluid communication with the liquid reservoir; and
an independently controlled gas and liquid valve system that is configured to apply a cooling gas and a liquid to cool the first and second components after brazing, wherein the apparatus further includes a frame supported by a plurality of wheels for movement of the apparatus, and the quenching applicator, the liquid reservoir, the recirculation pump, and the liquid basin are a part of a closed-loop quenching system supported by the frame.

17. The apparatus of claim 16, wherein the valve system independently controls a gas flow rate from the gas supply and a liquid flow rate from the liquid reservoir.

18. A brazing apparatus comprising:
a mobile frame;
a plurality of wheels supporting the mobile frame for movement;
a fixture supported by the mobile frame and configured to support a part assembly;
an induction coil supported by the mobile frame and configured to move relative to the fixture and to heat the part assembly;
a quenching applicator supported by the mobile frame and configured to move relative to the induction coil and the fixture, the quenching applicator further configured to cool the part assembly after heating;
a quenching reservoir supported by the mobile frame and configured to store coolant for recirculation of the coolant to the quenching applicator through a pump supported by the mobile frame; and
a controller supported by the mobile frame and configured to control movement of the induction coil and the quenching applicator.

19. The brazing apparatus of claim 18, further comprising:
memory coupled to the controller and configured to store a plurality of control schemes corresponding to a plurality of different part assemblies, each control scheme configured to independently determine the position of the induction coil and the quenching applicator relative to the respective part assembly; and
a user input coupled to the controller and configured to receive input from a user representing a first part assembly.

20. The brazing apparatus of claim 19, wherein the controller retrieves a first control scheme from the plurality of control schemes in memory based on the user input representing the first part assembly, the first control scheme instructing the controller to position the induction coil and the quenching applicator in a predetermined position for the first part assembly.

21. The brazing apparatus of claim 19, wherein the first control scheme further instructs the controller to activate the induction coil and the quenching applicator at predetermined times.

22. The brazing apparatus of claim 19, wherein the quenching applicator includes a nozzle configured to apply the coolant to the part assembly after a brazing operation.

23. The brazing apparatus of claim 22, wherein the coolant is at least one of a gas and a liquid.

24. The brazing apparatus of claim 23, wherein the control schemes are each configured to instruct the controller to supply the nozzle with low pressure gas in between brazing operations.

25. The brazing apparatus of claim 24, wherein the low pressure gas is between about 4 psi and about 8 psi.

26. The brazing apparatus of claim 18, wherein the control system includes a programmable logic controller.

27. The apparatus of claim 18, wherein the part assembly includes a first component and a second component, the part assembly having a fluid conduit passing through the first component and the second component.

28. The apparatus of claim 18, wherein the fixture includes a lower post having an opening for receiving the coolant from the part assembly, an upper post having an opening for supplying the coolant to the fluid conduit of the first component; and a biasing member which acts to reduce a separation between the lower post and the upper post.

29. The apparatus of claim 18, wherein the part assembly further includes a third component having a fluid conduit in an interior thereof.

30. An apparatus for brazing a first component to a second component, the mobile apparatus comprising:

an induction coil configured to heat the first and second components and for brazing the first component to the second component, the first and second components each including a fluid conduit in an interior thereof;

a closed-loop quenching system including an applicator, the applicator configured to apply a coolant through the fluid conduit of each of the first and second components; and a mobile frame supporting the closed-loop quenching system and the induction coil, the mobile frame permitting movement of the mobile apparatus.

31. The apparatus of claim 30, wherein a gas is applied to the first and second components followed by a liquid, both the gas and liquid applied to cool the first component and the second component.

32. The apparatus of claim 30, wherein the coolant is further applied to an exterior of the first component and an exterior of the second component.

* * * * *